United States Patent
Peng et al.

(10) Patent No.: US 10,003,792 B2
(45) Date of Patent: Jun. 19, 2018

(54) VIDEO ENCODER FOR IMAGES

(71) Applicant: Microsoft Corporation, Redmond, WA (US)

(72) Inventors: Xiulian Peng, Beijing (CN); Fei Liang, Beijing (CN); Ji-Zheng Xu, Beijing (CN); Feng Wu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 188 days.

(21) Appl. No.: 14/360,911

(22) PCT Filed: May 27, 2013

(86) PCT No.: PCT/CN2013/076254
§ 371 (c)(1),
(2) Date: May 27, 2014

(87) PCT Pub. No.: WO2014/190468
PCT Pub. Date: Dec. 4, 2014

(65) Prior Publication Data
US 2015/0016521 A1    Jan. 15, 2015

(51) Int. Cl.
H04N 19/14    (2014.01)
H04N 19/50    (2014.01)
H04N 19/176    (2014.01)
H04N 19/119    (2014.01)
H04N 19/147    (2014.01)
H04N 19/96    (2014.01)
H04N 19/136    (2014.01)
H04N 19/146    (2014.01)
H04N 19/192    (2014.01)

(52) U.S. Cl.
CPC ..... *H04N 19/00569* (2013.01); *H04N 19/119* (2014.11); *H04N 19/136* (2014.11);
(Continued)

(58) Field of Classification Search
None
See application file for complete search history.

(56) References Cited

U.S. PATENT DOCUMENTS 6,753,878 B1    6/2004   Heirich et al.
6,763,068 B2    7/2004   Oktem
(Continued)

FOREIGN PATENT DOCUMENTS

CN    1694533    11/2005
CN    102055977   5/2011
(Continued)

OTHER PUBLICATIONS

Do, "An Early Block Type Decision Method for Intra Prediction in H.264/AVC," IEEE (2009).*
(Continued)

*Primary Examiner* — Jay Patel
*Assistant Examiner* — Shadan E Haghani
(74) *Attorney, Agent, or Firm* — Klarquist Sparkman, LLP

(57) ABSTRACT

Some implementations can compress a digital image to create a compressed image corresponding to the digital image. The digital image can be divided into a plurality of coding units and a determination can be made whether to divide each coding unit of the plurality of coding units into smaller coding units/prediction units based on (i) a range of pixel values in each coding unit and/or (ii) a number of bits to encode the coding unit. Rate distortion optimization can be performed based on a size of each of the prediction units. A determination can be made whether to perform a transform for each of the transform units based on a size of each prediction unit and/or a spatial frequency measure associated with each transform unit.

15 Claims, 14 Drawing Sheets

(52) U.S. Cl.
CPC .......... *H04N 19/14* (2014.11); *H04N 19/146* (2014.11); *H04N 19/147* (2014.11); *H04N 19/176* (2014.11); *H04N 19/192* (2014.11); *H04N 19/96* (2014.11)

(56) References Cited

U.S. PATENT DOCUMENTS

| | | | |
|---|---|---|---|
| 7,260,148 B2 | 8/2007 | Sohm | |
| 7,580,456 B2 | 8/2009 | Li et al. | |
| 7,733,380 B1 | 6/2010 | Cote et al. | |
| 7,764,738 B2 | 7/2010 | Kim et al. | |
| 7,843,995 B2 | 11/2010 | Bhaskaran et al. | |
| 7,903,733 B2 | 3/2011 | Panda et al. | |
| 8,254,455 B2 | 8/2012 | Wu et al. | |
| 8,270,467 B1* | 9/2012 | Wang | H04N 19/176 375/240 |
| 8,295,356 B2 | 10/2012 | He et al. | |
| 8,331,449 B2 | 12/2012 | Kim et al. | |
| 8,335,255 B2 | 12/2012 | Lee et al. | |
| 8,379,728 B2 | 2/2013 | Katzur et al. | |
| 8,379,996 B2 | 2/2013 | Murata et al. | |
| 8,428,373 B2 | 4/2013 | Jeon et al. | |
| 8,457,202 B2 | 6/2013 | Wang et al. | |
| 8,467,448 B2 | 6/2013 | Hsiang et al. | |
| 8,514,933 B2 | 8/2013 | Liang et al. | |
| 8,693,551 B2 | 4/2014 | Zheludkov et al. | |
| 8,737,477 B2 | 5/2014 | La et al. | |
| 8,743,949 B2 | 6/2014 | Srinivasan et al. | |
| 8,804,836 B2 | 8/2014 | Nilsson et al. | |
| 9,137,544 B2 | 9/2015 | Lin et al. | |
| 9,219,915 B1 | 12/2015 | Bultje et al. | |
| 2002/0025001 A1 | 2/2002 | Ismaeil et al. | |
| 2003/0156648 A1 | 8/2003 | Holcomb et al. | |
| 2004/0264575 A1 | 12/2004 | Bjontegaard | |
| 2005/0069211 A1 | 3/2005 | Lee et al. | |
| 2005/0084012 A1 | 4/2005 | Hsu et al. | |
| 2005/0207497 A1 | 9/2005 | Rovati et al. | |
| 2006/0098738 A1 | 5/2006 | Cosman et al. | |
| 2006/0164543 A1 | 7/2006 | Richardson et al. | |
| 2007/0030894 A1 | 2/2007 | Tian et al. | |
| 2007/0031051 A1* | 2/2007 | Lee | H04N 19/172 382/239 |
| 2007/0140344 A1 | 6/2007 | Shima | |
| 2007/0177668 A1 | 8/2007 | Park | |
| 2007/0263720 A1 | 11/2007 | He | |
| 2007/0274396 A1 | 11/2007 | Zhang et al. | |
| 2008/0279466 A1* | 11/2008 | Yang | H04N 19/176 382/246 |
| 2009/0073005 A1 | 3/2009 | Normile et al. | |
| 2009/0129472 A1 | 5/2009 | Panusopone et al. | |
| 2009/0168878 A1 | 7/2009 | Kawashima | |
| 2009/0190660 A1 | 7/2009 | Kusakabe et al. | |
| 2009/0245353 A1 | 10/2009 | Choi et al. | |
| 2009/0290641 A1 | 11/2009 | Crinon et al. | |
| 2010/0020872 A1* | 1/2010 | Shimizu | H04N 19/196 375/240.12 |
| 2010/0061447 A1 | 3/2010 | Tu et al. | |
| 2010/0074338 A1* | 3/2010 | Yamori | H04N 19/139 375/240.16 |
| 2010/0150253 A1 | 6/2010 | Kuo et al. | |
| 2010/0189179 A1 | 7/2010 | Gu et al. | |
| 2010/0215104 A1 | 8/2010 | Osamoto et al. | |
| 2010/0246684 A1 | 9/2010 | Naito et al. | |
| 2010/0260271 A1 | 10/2010 | Kapoor | |
| 2010/0290521 A1 | 11/2010 | Liu et al. | |
| 2011/0013700 A1 | 1/2011 | Kim | |
| 2011/0051813 A1 | 3/2011 | Krishnan et al. | |
| 2011/0109753 A1 | 5/2011 | Srinivasamurthy et al. | |
| 2011/0142134 A1* | 6/2011 | Wahadaniah | H04N 19/176 375/240.16 |
| 2011/0164677 A1 | 7/2011 | Lu et al. | |
| 2011/0200264 A1* | 8/2011 | Park | H04N 19/139 382/236 |
| 2011/0243225 A1* | 10/2011 | Min | H04N 19/44 375/240.12 |
| 2011/0268187 A1 | 11/2011 | Lamy-Bergot et al. | |
| 2011/0274357 A1 | 11/2011 | Iwamoto et al. | |
| 2011/0286520 A1 | 11/2011 | Xu et al. | |
| 2011/0292998 A1* | 12/2011 | Ohgose | H04N 19/176 375/240.08 |
| 2012/0195366 A1 | 8/2012 | Liu et al. | |
| 2012/0200663 A1 | 8/2012 | Sievers et al. | |
| 2012/0281760 A1 | 11/2012 | Kim | |
| 2013/0003838 A1* | 1/2013 | Gao | H04N 19/176 375/240.12 |
| 2013/0003860 A1 | 1/2013 | Sasai et al. | |
| 2013/0016777 A1 | 1/2013 | Gao et al. | |
| 2013/0021483 A1 | 1/2013 | Bennett et al. | |
| 2013/0028317 A1 | 1/2013 | Parfenov et al. | |
| 2013/0089143 A1 | 4/2013 | Siddaramanna et al. | |
| 2013/0114696 A1 | 5/2013 | Liu | |
| 2013/0114730 A1 | 5/2013 | Joshi et al. | |
| 2013/0121401 A1 | 5/2013 | Zheludkov et al. | |
| 2013/0128952 A1 | 5/2013 | Kwon et al. | |
| 2013/0128964 A1 | 5/2013 | Chien et al. | |
| 2013/0216149 A1 | 8/2013 | Sato | |
| 2013/0230098 A1 | 9/2013 | Song et al. | |
| 2013/0266073 A1 | 10/2013 | Macinnis et al. | |
| 2013/0272389 A1 | 10/2013 | Sze et al. | |
| 2013/0308696 A1 | 11/2013 | Kim et al. | |
| 2013/0343462 A1* | 12/2013 | Li | H04N 19/96 375/240.18 |
| 2013/0343464 A1 | 12/2013 | Van der Auwera et al. | |
| 2014/0064359 A1 | 3/2014 | Rapaka et al. | |
| 2014/0079133 A1 | 3/2014 | Sato | |
| 2014/0219331 A1 | 8/2014 | Pai et al. | |
| 2014/0219342 A1 | 8/2014 | Yu et al. | |
| 2014/0219349 A1 | 8/2014 | Chien et al. | |
| 2014/0226713 A1 | 8/2014 | Perlman et al. | |
| 2014/0229186 A1 | 8/2014 | Mehrotra et al. | |
| 2014/0241420 A1 | 8/2014 | Orton-Jay et al. | |
| 2014/0254676 A1 | 9/2014 | Jiang et al. | |
| 2014/0269919 A1 | 9/2014 | Rodriguez | |
| 2014/0301465 A1 | 10/2014 | Kwon et al. | |
| 2014/0369413 A1 | 12/2014 | Clark | |
| 2015/0098500 A1 | 4/2015 | Oh et al. | |
| 2015/0189269 A1 | 7/2015 | Han et al. | |
| 2015/0271510 A1 | 9/2015 | Wen et al. | |
| 2016/0094855 A1 | 3/2016 | Zhou | |

FOREIGN PATENT DOCUMENTS

| | | |
|---|---|---|
| CN | 102148989 | 8/2011 |
| CN | 102665078 | 9/2012 |
| CN | 103118262 | 5/2013 |
| CN | 103248895 | 8/2013 |
| CN | 103281538 | 9/2013 |
| CN | 103384327 | 11/2013 |
| CN | 103533325 | 1/2014 |
| CN | 103763570 | 4/2014 |
| EP | 1369820 | 12/2003 |
| EP | 1603338 | 12/2005 |
| EP | 1761069 | 3/2007 |
| EP | 2618572 | 7/2013 |
| JP | 2003244696 A * | 8/2003 |
| WO | WO 2004/080084 | 9/2004 |
| WO | WO 2012/071949 | 6/2012 |
| WO | WO 2013/028580 | 2/2013 |
| WO | WO 2013/143103 | 10/2013 |
| WO | WO 2013/181821 | 12/2013 |
| WO | WO 2014/083491 | 6/2014 |

OTHER PUBLICATIONS

Jiang, "Gradient Base Fast Mode Decision Algorithm for Intra Prediction in HEVC," IEEE (2012).*
Kim, "Block Partitioning Structure in HEVC Standard," IEEE (2012).*
Kim, "An Efficient and Fast Block Size Decision Exploiting Boundary Information of Inner Block for H.264/AVC Intra Prediction," IEEE (2008).*
Chang, "A Two Level Mode Decision Algorithm for H.264 High Profile Intra Encoding," IEEE (20012).*

(56) References Cited

OTHER PUBLICATIONS

Kim, Jongho, "Fast Coding Unit Size Decision Algorithm for Intra Coding in HEVC," IEEE (Jan. 2013).*
Shen, Xiaolin, "Fast Coding Unit Size Selection for HEVC based on Bayesian Decision Rule," Picture Coding Symposium (2012).*
BenHajyoussef et al., "Fast Gradient Based Intra Mode Decision for High Efficiency Video Coding," *Int'l Journal of Emerging Trends & Technology in Computer Science*, vol. 3, Issue 3, pp. 223-228 (May 2014).
Flynn et al., "High Efficiency Video Coding (HEVC) Range Extensions text specification: Draft 6," JCTVC-P1005_v1, 355 pp. (Jan. 2014).
Fritts et al., "Fast Intra-Prediction Mode Selection for H.264," Powerpoint, presentation, downloaded from the World Wide Web, 23 pp. (downloaded on Apr. 17, 2015—document not dated).
Gabriellini et al., "Adaptive Transform Skipping for Improved Coding of Motion Compensated Residuals," BBC Research & Development White Paper, WHP 246, 22 pp. (Mar. 2013).
Gan et al., "Novel multi-frame fast motion search algorithm based on H.264," *Journal on Communications*, vol. 28, No. 1, pp. 17-21 (Jan. 2007).
"How VP9 works, technical details & diagrams," downloaded from the World Wide Web, 12 pp. (document marked Oct. 2013).
Hsu et al., "Fast Coding Unit Decision Algorithm for HEVC," Signal and Information Processing Association Annual Summit and Conf., 5 pp. (Oct. 2013).
Hu et al., "Fast Inter-Mode Decision Based on Rate-Distortion Cost Characteristics," *Proc. of the Advances in Multimedia Information Processing and 11th Pacific Rim Conf. on Multimedia*, pp. 145-155 (Sep. 2010).
International Preliminary Report on Patentability dated Dec. 10, 2015, from International Patent Application No. PCT/CN2013/076254, 6 pp.
Khan et al., "Fast Hierarchical Intra Angular Mode Selection for High Efficiency Video Coding," *Proc. Int'l Conf. on Image Processing*, 5 pp. (Oct. 2014).
Kim et al., "Fast Intra/Inter Mode Decision for H.264 Encoding Using a Risk-Minimization Criterion," *SPIE Proc., Applications of Digital Image Process*, vol. 5558, 11 pp. (Nov. 2004).
Kim et al., "Fast Intra Mode Decision of HEVC Based on Hierarchical Structure," *Proc. 8th Int'l Conf. on Information, Communications, and Signal Processing*, 4 pp. (Dec. 2011).
Kim et al., "Fast Skip Mode Decision with Rate-Distortion Optimization for High Efficiency Video Coding," *IEEE Int'l Conf. on Multimedia and Expo Workshops*, 6 pp. (Jul. 2014).
Lan et al., "Intra transform skipping," JCTVC-I0408, 11 pp. (May 2012).
Lee et al., "Early termination of transform skip mode for High Efficiency Video coding," *Int'l Conf. on Communications, Signal Processing and Computers*, pp. 177-181 (Feb. 2014).
Lee et al., "Fast Direct Mode Decision Algorithm based on Optimal Mode Pattern Searching," *Int'l Journal of Multimedia and Ubiquitous Engineering*, vol. 7, No. 2, pp. 415-420 (Apr. 2012).
Lei et al., "Fast Intra Prediction Mode Decision for High Efficiency Video Coding," *Int'l Symp. on Computer, Communication, Control and Automation*, pp. 34-37 (Nov. 2013).
Li et al., "Description of screen content coding technology proposal by Microsoft," JCTVC-Q0035, 27 pp. (Mar. 2014).
Li et al., "Low complexity encoders for JCTVC-Q0035," JCTVC-Q0052, 4 pp. (Mar. 2014).
Liao et al., "Rate-Distortion Cost Estimation for H.264/AVC," *IEEE Trans. on Circuits and Systems for Video Technology*, vol. 20, No. 1, pp. 38-49 (Jan. 2010).
Lin et al., "Fast Mode Decision for H.264 Based on Rate-Distortion Cost Estimation," *IEEE Int'l Conf. on Acoustics, Speech and Signal Processing*, vol. 1, 4 pp. (Apr. 2007).
Ma et al., "Rate Distortion Cost Modeling of Skip Mode and Early Skip Mode Selection for H.264," *SPIE Proc., Visual Communications and Image Processing*, vol. 7257, 4 pp. (Jan. 2009).
Mrak et al., "Improving Screen Content Coding in HEVC by Transform Skipping," *20th European Signal Processing Conf.*, pp. 1209-1213 (Aug. 2012).
Pan et al., "Content Adaptive Frame Skipping for Low Bit Rate Video Coding," *Int'l Conf. on Information, Communications and Signal Processing*, pp. 230-234 (Dec. 2003).
Richardson et al., "Fast H.264 Skip Mode Selection Using an Estimation Framework," *Proc. of Picture Coding Symp.*, 5 pp. (Apr. 2006).
Sharabayko et al., "Research on H.265/HEVC Intra Prediction Modes Selection Frequencies," *Int'l Conf. for Students and Young Scientists*, 3 pp. (Apr. 2014).
Shen et al., "Adaptive Transform Size Decision Algorithm for High-Efficiency Video Coding Inter Coding," *Journal of Electronic Imaging*, vol. 23, Issue 4, 9 pp. (Aug. 2014).
Shen et al., "Effective CU Size Decision for HEVC Intracoding," *IEEE Trans. on Image Processing*, vol. 23, No. 10, pp. 4232-4241 (Oct. 2014).
Tagliasacchi et al., "Hash-Based Motion Modeling in Wyner-Ziv Video Coding," *IEEE Int'l Conf. on Acoustics, Speec and Signal Processing*, vol. 1, pp. 509-512 (Apr. 2007).
Tian et al., "Content Adaptive Prediction Unit Size Decision Algorithm for HEVC Intra Coding," *Picture Coding Symp.*, 4 pp. (May 2012).
Vanam, "Motion Estimation and Intra Frame Prediction in H.264/AVC Encoder," Powerpoint presentation, downloaded from the World Wide Web, 31 pp. (Nov. 2013).
Wang et al., "An Efficient Mode Decision Algorithm for H.264/AVC Encoding Optimization," *IEEE Trans. on Multimedia*, vol. 9, No. 4, pp. 882-888 (Jun. 2007).
Wang et al., "An Effective TU Size Decision Method for Fast HEVC Encoders," *Int'l Symp. on Computer, Consumer and Control*, 4 pp. (Jun. 2014).
Wang et al., "Prediction of Zero Quantized DCT Coefficients in H.264/AVC Using Hadamard Transformed Information," *IEEE Trans. on Circuits and Systems for Video Technology*, vol. 18, No. 4, pp. 510-515 (Apr. 2008).
Wei et al., "A Fast Macroblock Mode Decision Algorithm for H.264," *IEEE Asia Pacific Conf. on Circuits and Systems*, pp. 772-775 (Dec. 2006).
Won et al., "Transform skip based on minimum TU size," JCTVC-N0167, 10 pp. (Aug. 2013).
Xin et al., "Fast Inter Prediction Block Mode Decision Approach for H.264/AVC Based on All-Zero Blocks Detection," *IEEE Conf. on Industrial Electronics and Applications*, pp. 896-899 (Jun. 2013).
Al et al., "Quality and Complexity Comparison of H.264 Intra Mode with JPEG2000 and JPEG," *IEEE Int'l Conf. on Image Processing*, vol. 1, pp. 525-528 (Oct. 2004).
Armbrust, "Capturing Growth: Photo Apps and Open Graph," 8 pp., downloaded from https://developers.facebook.com/blog/post/2012/07/17/capturing-growth--photo-apps-and-open-graph/ (Jul. 17, 2012).
Bjontegaard, "Calculation of Average PSNR Differences Between RD-curves," ITU-T VCEG-M33, 4 pp. (Apr. 2001).
Bross et al., "High Efficiency Video Coding (HEVC) Text Specification draft 8," JCTVC-J1003_d7, 260 pp. (Jul. 2012).
Ding et al., "Enable Efficient Compound Image Compression in H.264/AVC Intra Coding," *IEEE Int'l Conf. on Image Processing*, vol. 2, pp. 337-340 (Sep. 2007).
International Search Report and Written Opinion dated Mar. 13, 2014, from International Patent Application No. PCT/CN2013/076254, 10 pp.
Jiang et al., "Gradient Based Fast Mode Decision Algorithm for Intra Prediction in HEVC," *Int'l Conf. on Consumer Electronics, Communications and Networks*, pp. 1836-1840 (Jan. 2012).
Kim et al., "A Fast Intra Mode Skip Decision Algorithm Based on Adaptive Motion Vector Map," *Digest of Technical Papers Int'l Conf. on Consumer Electronics*, 2 pp. (Jan. 2009).
Kim et al., "TE9-1 Report on Performance Tests for Different CTU and TU Sizes," JCTVC-C067, 13 pp. (Oct. 2010).
Lan et al., "Compress Compound Images in H.264/MPEG-4 AVC by Exploiting Spatial Correlation," *IEEE Trans. on Image Processing*, vol. 19, No. 4, pp. 946-957 (Apr. 2010).

(56) References Cited

OTHER PUBLICATIONS

Liang et al., "A Light-Weight HEVC Encoder for Image Coding," *Visual Communications and Image Processing*, 5 pp. (Nov. 2013).
Nguyen et al., "Performance Analysis of HEVC-based Intra Coding for Still Image Compression," *Picture Coding Symposium*, pp. 233-236 (May 2012).
Panusopone et al., "Evaluation of RQT in HM and Related TU Representation," JCTVC-E365, 9 pp. (Mar. 2011).
Panusopone et al., "Evaluation of RQT in HM and Related TU Representation," JCTVC-E365 slideshow, 9 pp. (Mar. 2011).
Piao et al., "Encoder Improvement of Unified Intra Prediction," JCTVC-C207, 5 pp. (Oct. 2010).
Rhee et al., "A Survey of Fast Mode Decision Algorithms for Inter-Prediction and Their Applications to High Efficiency Video Coding," *IEEE Trans. on Consumer Electronics*, vol. 58, No. 4, pp. 1375-1383 (Nov. 2012).
Shen et al., "CU Splitting Early Termination Based on Weighted SVM," *EURASIP Journal on Image and Video Processing*, 7 pp. (Jan. 2013).
Smith, "Ooh! Aah! Google Images Presents a Nicer Way to Surf the Visual Web," 4 pp., downloaded from http://googleblog.blogspot.com/2010/07/ooh-ahh-google-images-presents-nicer.html (Jul. 20, 2010).
Teng et al., "Fast Mode Decision Algorithm for Residual Quadtree Coding in HEVC," *IEEE Visual Communications and Image Processing*, 4 pp. (Nov. 2011).
Wiegand et al., "Draft ITU-T Recommendation and Final Draft International Standard of Joint Video Specification (ITU-T Rec. H.264 | ISO/IEC 14496-10 AVC)," JVT-G050r1, 269 pp. (May 2003).
Yu et al., "Early Termination of Coding Unit Splitting for HEVC," *Asia-Pacific Signal & Information Processing Association Annual Summit and Conf.*, 4 pp. (Dec. 2012).
Zhang et al., "Early Termination Schemes for Fast Intra Mode Decision in High Efficiency Video Coding," *IEEE Int'l Symp. on Circuits and Systems*, pp. 45-48 (May 2013).
Zhang et al., "Fast Intra Prediction for High Efficiency Video Coding," *Proc. 13th Pacific Rim Conf. on Advances in Multimedia Information Processing*, 10 pp. (Dec. 2012).
Zhao et al., "Further Encoder Improvement of Intra Mode Decision," JCTVC-D283, 4 pp. (Jan. 2011).
Zhao et al., "Further Encoder Improvement of Intra Mode Decision," JCTVC-D283 slideshow, 14 pp. (Jan. 2011).
Deng et al., "Fast Mode Decision Algorithm for Inter-Layer Intra Prediction in SVC," IEEE Int'l Conf. on Broadband Network and Multimedia Technology, pp. 212-216 (Oct. 2011).
Hu et al., "Analysis and Optimization of x265 Encoder," IEEE Visual Communications and Image Processing Conf., pp. 502-505 (Dec. 2014).
Kibeya et al., "A Fast Coding Algorithm Based on Fast Mode Decision for HEVC Standard," IEEE Int'l Conf. on Sciences and Techniques of Automatic Control & Computer Engineering, pp. 158-163 (Dec. 2013).
Kim et al., "A Fast Intra Mode Skip Decision Algorithm Based on Adaptive Motion Vector Map," *IEEE Trans. on Consumer Electronics*, vol. 55, No. 1, pp. 179-184 (Feb. 2009).
Kim et al., "A Fast Intra Skip Detection Algorithm for H.264/AVC Video Encoding," *ETRI Journal*, vol. 28, No. 6, pp. 721-731 (Dec. 2006).
Kim et al., "Efficient Intra-mode Decision Algorithm for Inter-frames in H.264/AVC Video Coding," IET Image Processing, vol. 5, No. 3, pp. 286-295 (Apr. 2011).
U et al., "An Early Intra Mode Skipping Technique for Inter Frame Coding in H.264 BP," *Digest of Technical Papers, Int'l Conf. on Consumer Electronic*, 2 pp. (Jan. 2007).
Wang et al., "An Efficient Intra Skip Decision Algorithm for H.264/AVC Video Coding," *Journal of Applied Science and Engineering*, vol. 17, No. 3, pp. 329-339 (May 2014).
Chen et al., "Fast Integer Pel and Fractional Pel Motion Estimation for AVC," ISO/IEC MPEG 2002/M9117, 16 pp. (Nov. 2002).
Chen et al., "Fast Motion Estimation for JVT," JVT-G016, 12 pp. (Mar. 2003).
Lin et al., "CE6 Subset 5.2.2 and 6.2.2: Intra Coding Improvements," JCTVC-H0057, 6 pp. (Feb. 2012).
Sun et al., "An Efficient Multi-Frame Dynamic Search Range Motion Estimation for H.264," *Visual Communications and Image Processing*, vol. 6508, 10 pp. (Jan. 2007).
Tabatabai et al., "Core Experiment 6: Intra Prediction Improvement," JCTVC-D606_r1, 13 pp. (Jan. 2011).
Zhang et al., "Improved Intra Prediction Mode-decision Method," *Visual Communications and Image Processing*, vol. 5960, pp. 632-646 (Jul. 2005).
Shen et al., "Fast CU Size Decision and Mode Decision Algorithm for HEVC Intra Coding," *IEEE Trans. On Consumer Electronics*, vol. 59, No. 1, pp. 207-213 (Feb. 2013).
Bhaskaranand et al., "Low-complexity Video Encoding for UAV Reconnaissance and Surveillance," Proc. of Military Communications Conference, 6 pp. (Nov. 2011).
Fernando et al., "DFD Based Segmentation for H.263 Video Sequences," *IEEE Int'l Symp. On Circuits and Systems*, vol. 4, pp. 520-523 (May 1999).
Gardos et al., "Video Codec Test Model, Near-Term, Version 8 (TMN8)," ITU Study Group 16, Document Q15-A-59, 56 pp. (Jun. 1997).
Huade et al., "A Fast CU Size Decision Algorithm Based on Adaptive Depth Selection for HEVC Encoder," *IEEE Int'l Conf. on Audio, Language and Image Processing*, pp. 143-146 (Jul. 2014).
Microsoft Corporation, "Codec API Properties," downloaded from the World Wide Web, 10 pp. (downloaded on Apr. 17, 2015).
Microsoft Corporation, "H.264 Video Encoder," downloaded from the World Wide Web, 8 pp. (downloaded on Apr. 17, 2015).
Microsoft Corporation, "ICodecAPI Interface," downloaded from the World Wide Web, 3 pp. (downloaded on Apr. 17, 2015).
Microsoft Corporation, "IMFSample Interface," downloaded from the World Wide Web, 3 pp. (downloaded on Apr. 17, 2015).
Microsoft Corporation, "IMFTransform Interface," downloaded from the World Wide Web, 3 pp. (downloaded on Apr. 17, 2015).
Microsoft Corporation, "Sample Attributes," downloaded from the World Wide Web, 3 pp. (downloaded on Apr. 17, 2015).
Rodriguez et al., "Using Telemetry Data for Video Compression on Unmanned Air Vehicles," *AIAA Guidance, Navigation and Control Conference*, 8 pp. (Aug. 2006).
Sullivan et al., "The H.264/AVC Advanced Video Coding Standard: Overview and Introduction to the Fidelity Range Extensions," *SPIE Conf. on Applications of Digital Image Processing*, vol. 5558, pp. 454-474 (Aug. 2004).
Usach-Molina et al., "Content-Based Dynamic Threshold Method for Real-Time Keyframe Selecting," *IEEE Trans. On Circuits and Systems for Video Technology*, vol. 20, No. 7, pp. 982-993 (Jul. 2010).

\* cited by examiner

900

DISTRIBUTION FOR
SPATIAL FREQUENCY MEASURE (SFM) ENCODING
WITH TRANSFORM
902

DISTRIBUTION FOR
SPATIAL FREQUENCY MEASURE (SFM) ENCODING
WITHOUT TRANSFORM
904

VIDEO ENCODER FOR IMAGES

CROSS REFERENCE TO RELATED APPLICATIONS

This is a U.S. National Stage of International Application No. PCT/CN2013/076254, filed May 27, 2013, which is incorporated by reference herein in its entirety.

BACKGROUND

High Efficiency Video Coding (HEVC) may provide superior performance compared to other image and video coding schemes. Typically, the superior performance of HEVC comes at the expense of increased encoding complexity as compared to other encoding schemes. As the amount of digital image data increases, managing, storing, and transmitting digital image data is becoming more challenging, particularly when using HEVC, due to the increased encoding complexity. Increased encoding complexity typically results in a computationally intensive process that requires large amounts of computational resources and/or time to perform.

SUMMARY

Some implementations can compress a digital image to create a compressed image corresponding to the digital image. The digital image can be divided into a plurality of coding units (CUs) and a determination can be made whether to divide each coding unit of the plurality of coding units into smaller coding units/prediction units based on (i) a range of pixel values in each coding unit and/or (ii) a number of bits to encode the coding unit. For example, early termination may occur when determining whether to divide a 16×16 CU into 8×8 CUs and/or whether to divide a 8×8 PU in a 8×8 CU into 4×4 PUs. Rate distortion optimization (RDO) with fast mode decisions can be performed to decide the prediction mode based on a size of each of the prediction units. A determination can be made whether to perform a transform for each of the transform units based on a size of each prediction unit and/or a spatial frequency measure associated with each transform unit. For example, when residual quad-tree (RQT) is disabled, a transform unit (TU) size is equal to a prediction unit (PU) size. The transform skip mode may be applied to a 4×4 TU where the PU size is also 4×4.

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The systems and techniques described herein can be used to encode digital images to create compressed representations of the digital images where the compressed representations have an imperceptible or barely perceptible loss of quality compared to the digital images. The systems and techniques described herein retain the high coding efficiency provided by high efficiency video coding (HEVC) while reducing the encoding complexity, thereby enabling faster encoding compared to a conventional (e.g., a reference) HEVC encoder. The terms "coding" and "encoding" are used interchangeably herein and refer to the process of creating a compressed representation of a digital image. While systems and techniques are described herein with reference to encoding images, the systems and techniques can also be used to more efficiently encode video data in addition to digital images. For example, by optimizing coding structure parameters, determining when to perform early termination when dividing a coding unit, using a fast intra-picture prediction, and determining when to skip performing a transform, the complexity of HEVC intra-picture coding can be reduced. To illustrate, the techniques described herein can be used to reduce encoding time by up to an average of 82% as compared to conventional HEVC encoders. Early termination may be used when determining whether to divide a 16×16 CU into 8×8 CUs and whether to divide a 8×8 PU in a 8×8 CU into 4×4 PUs.

HEVC encoding can be more complicated and more computationally intensive as compared to other image encoding standards, such as the Joint Photographic Experts Group (JPEG) standard. Most optimization techniques for HEVC focus on inter-picture coding, in which the differences between a current frame of a video and a previous frame of a video are coded. The techniques described herein are associated with intra-picture coding, in which parts of an image are encoded relative to other parts of the image. The systems and techniques are described herein to more efficiently perform HEVC intra-picture encoding, thereby creating a light-weight (e.g., less computationally intensive) HEVC encoder for encoding images. The optimizations can include one or more of coding structure parameter selection, coding unit early termination, fast intra-picture prediction mode decision, and fast transform skip mode.

Illustrative Architectures

Figure 1:
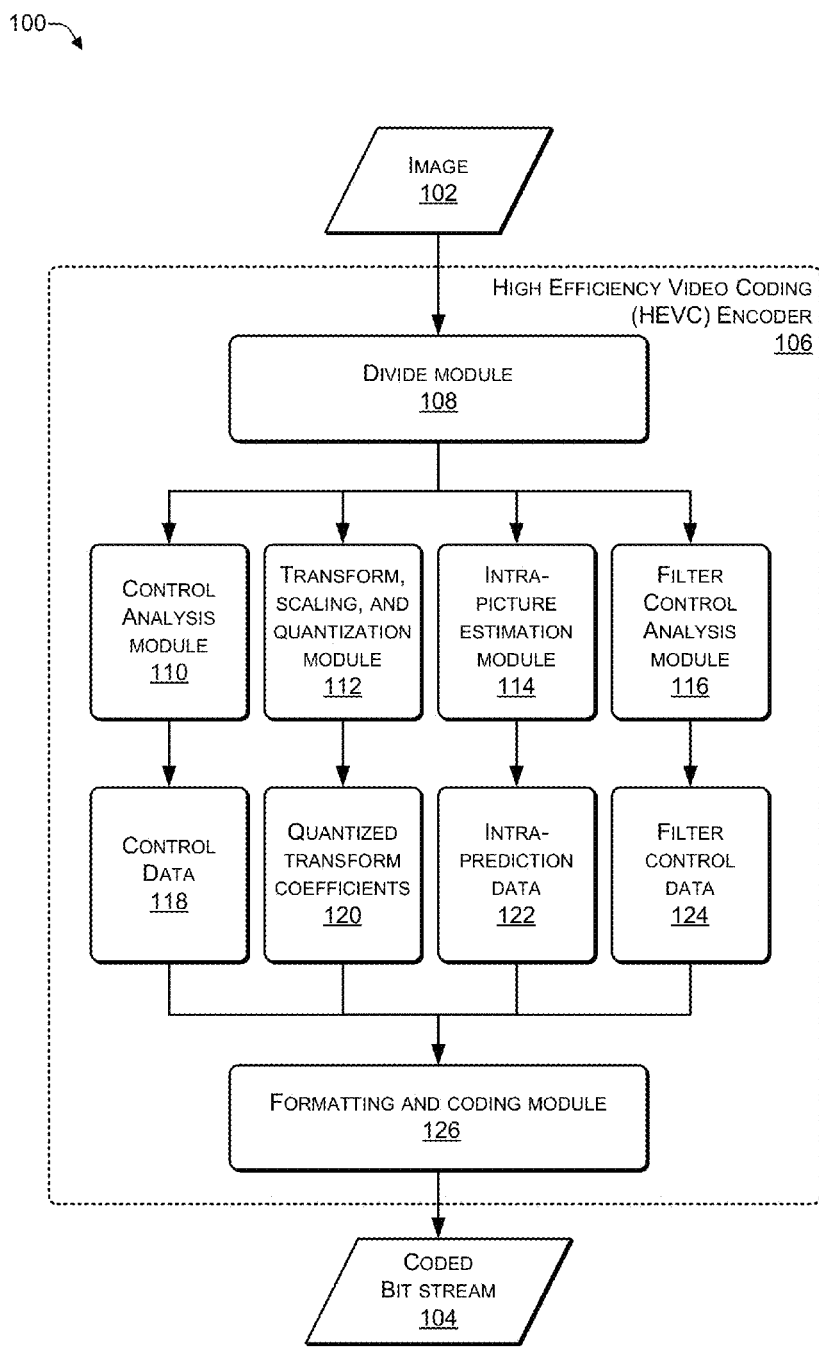
FIG. 1 is an illustrative architecture that includes a high efficiency video coding (HEVC) encoder with intra-picture estimation according to some implementations.

FIG. 1 is an illustrative architecture 100 that includes a high efficiency video coding (HEVC) encoder with intra-picture estimation according to some implementations. The architecture 100 includes an image 102 that can be converted into a coded bit stream 104 using an HEVC encoder 106.

The HEVC encoder 106 can include a divide module 108, a control analysis module 110, a transform, scaling, and quantization module 112, an intra-picture estimation module 114, and a filter control analysis module 116. In some implementations, operations of two or more of the modules 108, 110, 112, 114, or 116 can be performed by a single module. In addition, in some implementations, the two or more of the modules 108, 110, 112, 114, or 116 can operate substantially contemporaneously (e.g., in parallel).

The divide module 108 can divide the image 102 into smaller portions. For example, the divide module 108 can divide the image 102 into such as coding tree units (CTUs), divide at least some CTUs into coding units (CUs), divide each CU into prediction units (PUs), or any combination thereof. Dividing the image 102 into smaller portions can enable each portion to be processed substantially contemporaneously (e.g., substantially in parallel) with at least one other portion of the image 102, based on the number of processors and/or cores available. For example, a four-core processor can substantially contemporaneously process up to four portions of the image 102, an eight-core processor can substantially contemporaneously process up to eight portions of the image 102, and so on.

The control analysis module 110 can be used to analyze portions of the image 102 to determine control data 118. The transform, scaling, and quantization module 112 can be used to analyze portions of the image 102 to determine quantized transform coefficients 120. The intra-picture estimation module 114 can be used to analyze portions of the image 102 to determine intra-prediction data 122. Decoded boundary samples of adjacent block-shaped portions can be used as reference data for spatial prediction. The filter control analysis module 116 can be used to analyze portions of the image 102 to determine filter control data 124. A formatting and coding module 126 can create the coded bit stream 104 based on one or more of the control data 118, the quantized transform coefficients 120, the intra-prediction data 122, or the filter control data 124.

The divide module 108 can divide the image 102 into block-shaped portions. The block-shaped portions of the image 102 can be coded using the intra-picture estimation module that uses prediction of data spatially from region-to-region within the image 102, without depending on other images. A residual signal of the intra-picture estimation module 114 can include a difference between a block-shaped original portion and a corresponding prediction, and can be transformed using a linear spatial transform. The transform coefficients can be scaled, quantized, entropy coded, and transmitted together with the prediction information. The residual can be added to the prediction, and the result of that addition can then be fed into one or two loop filters to smooth out artifacts induced by block-wise processing and quantization. An order of encoding image or decoding images can differ from an order in which the images arrive from a source. Thus, there can be a distinction between a decoding order (e.g., bit stream order) and an output order (e.g., display order). For ease of understanding, the techniques and systems described herein assume that the decoding order is the same as the output order.

The HEVC encoder 106 can use an adaptive coding framework. The image 102 can be divided into a hierarchy of different blocks, which include coding units (CU), prediction units (PU) and transform units (TU). A CU is a basic partition of the image. A CU comprises a square block with a size varying from 64×64 pixels to 8×8 pixels. A CU with the largest size can be referred to as a coding tree unit (CTU). Each CU can be divided into four sub-CUs of equal sizes. For a particular CTU, the sub-CUs of the CTU can be organized in a quad-tree structure, in which the CTU is the parent node and the four sub-CUs are the child nodes in the quad-tree structure. An HEVC encoder can traverse the sub-CU nodes in one quad-tree to find the optimal partitioning for a CTU. Thus, different sizes of CU can be adaptively selected for different regions in one CTU. Each CU can be further divided into PUs that are the basic units for prediction. For intra-picture predictions, at least two sizes of PU, e.g., N×N or 2N×2N, can be used. A TU quad-tree structure can enable different transform sizes for different residual parts.

Thus, the HEVC encoder 106 can divide the image 102 into block-shaped portions and process at least two portions substantially contemporaneously using two or more of the modules 110, 112, 114, or 116. The coded bit stream 104 can be re-ordered to create an encoded image corresponding to the image 102.

Figure 2:
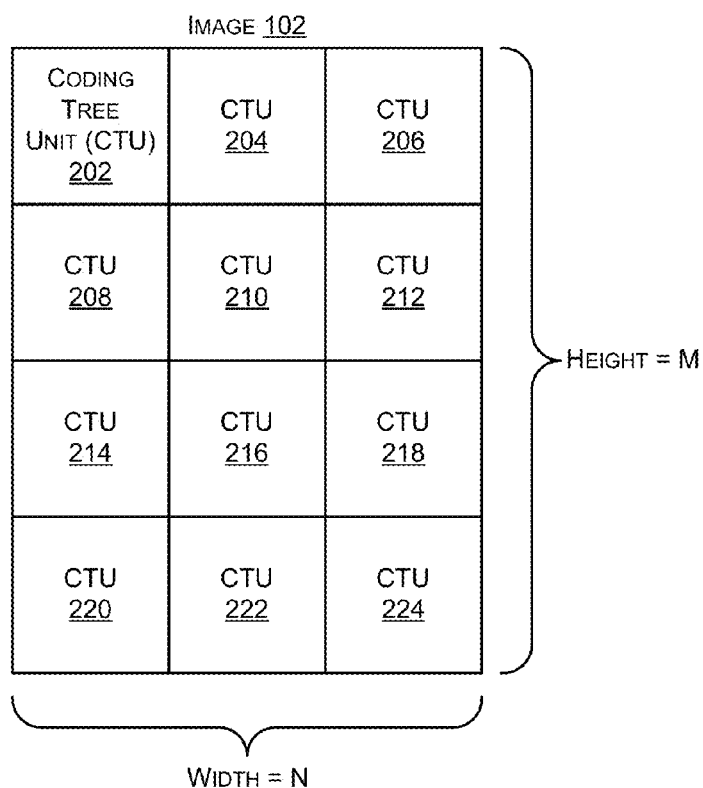
FIG. 2 is an illustrative architecture that includes dividing an image into coding tree units (CTUs) according to some implementations.

FIG. 2 is an illustrative architecture 200 that includes dividing an image into coding tree units (CTUs) according to some implementations. For example, the divide module 108 of FIG. 1 can divide the image 102, with a height of M pixels and a width of N pixels (where M>0, N>0), into coding tree units (CTUs), such as the CTUs 202, 204, 206, 208, 210, 212, 214, 216, 218, 220, 222, and 224. Of course, images with a different size can be divided into a fewer or a greater number of CTUs. Each of the CTUs 202, 204, 206, 208, 210, 212, 214, 216, 218, 220, 222, and 224 can be further subdivided, as illustrated in FIG. 3

Figure 3:
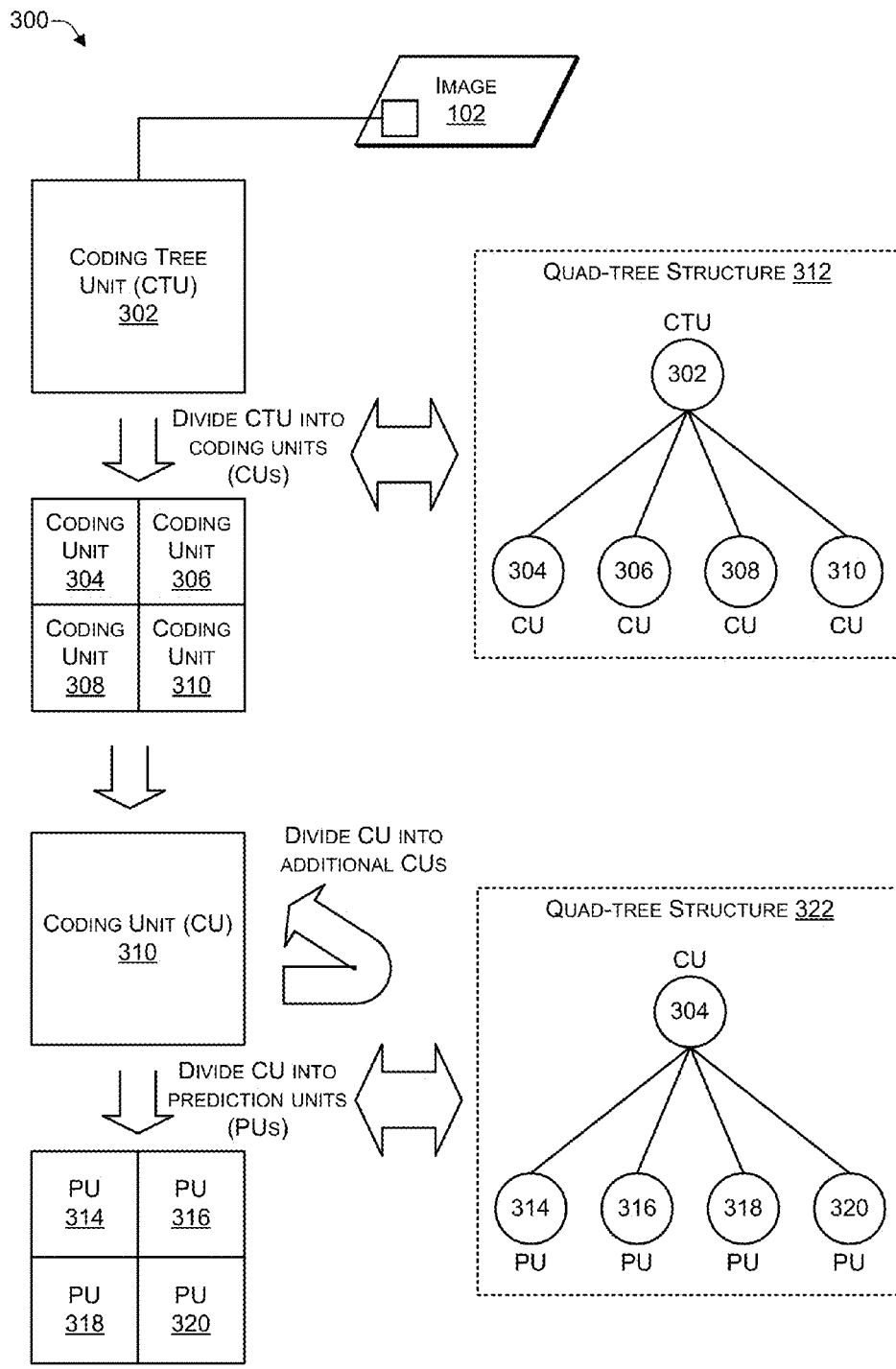
FIG. 3 is an illustrative architecture that includes dividing a coding tree unit (CTU) into coding units (CUs) and prediction units (PUs) according to some implementations.

FIG. 3 is an illustrative architecture 300 that includes dividing a coding tree unit (CTU) into coding units (CUs) and prediction units (PUs) according to some implementations. A CTU 302 (e.g., one of the CTUs 202, 204, 206, 208, 210, 212, 214, 216, 218, 220, 222, or 224) can be divided into coding units (CUs). For example, the CTU 302 can be divided into a CU 304, a CU 306, a CU 308, and a CU 310. A quad-tree is a hierarchical tree-structure in which each parent node has exactly four child nodes. As illustrated in FIG. 3, the relationship between the CTU 302 and the CUs 304, 306, 308, and 310 can be represented using a quad-tree structure 312.

At least some of the CUs 304, 306, 308, and 310 can be further divided into additional CUs. For example, a CU that has a relatively large range of pixel values can be divided into additional CUs (e.g., sub-CUs) while a CU that a relatively small range of pixel values can not be further divided into additional CUs. Each of the CUs 304, 306, 308, and 310 can be divided into prediction units (PUs). For example, the CU 304 can be divided into a PU 314, a PU 316, a PU 318, and a PU 320. The relationship between the CU 304 and the PUs 314, 316, 318, and 320 can be represented using a quad-tree structure 322.

Thus, the image 102 can be divided into CTUs, at least some of the CTUs can be divided into CUs, and at least some of the CUs can be divided into PUs.

Figure 4:
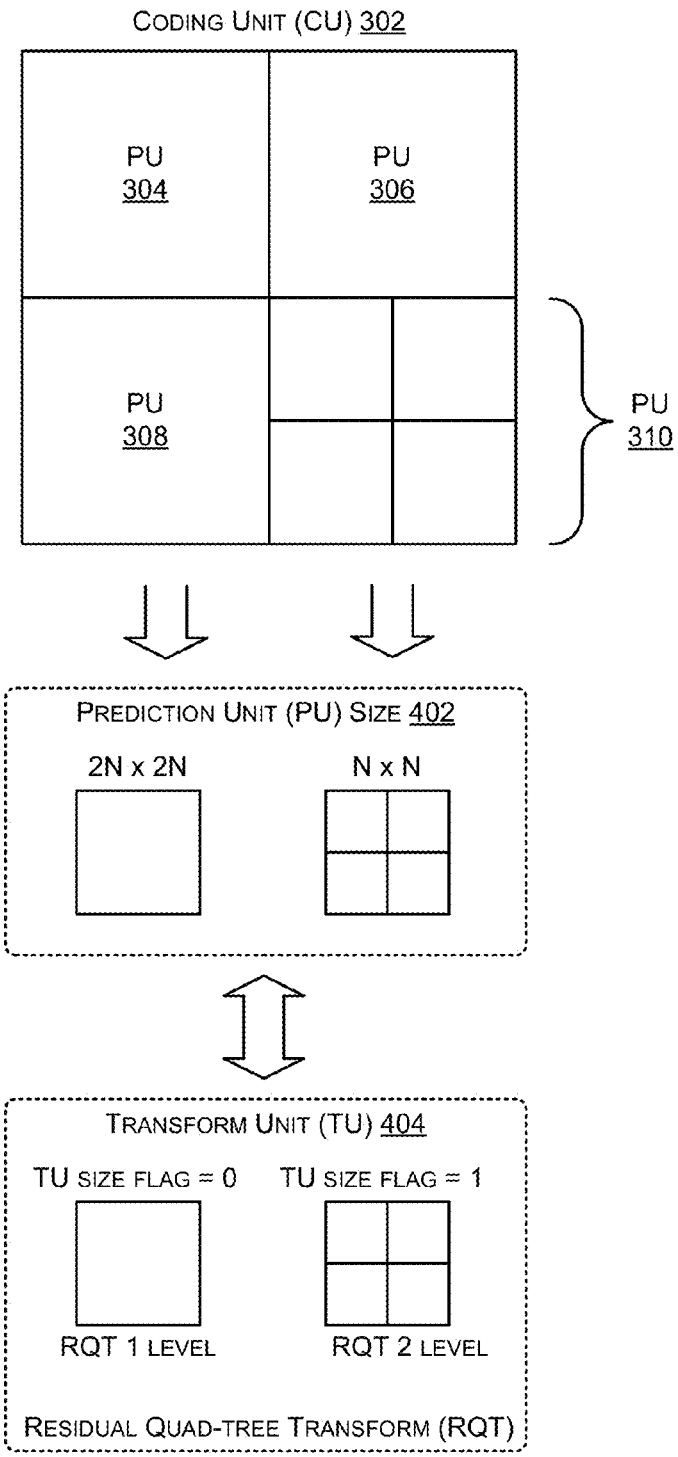
FIG. 4 is an illustrative architecture that includes coding units (CUs), prediction units (PUs) and transform units (TUs) according to some implementations.

FIG. 4 is an illustrative architecture 400 that includes coding units (CUs), prediction units (PUs), and transform units (TUs) according to some implementations. A PU size 402 can be either 2N×2N or N×N. For a transform unit that corresponds to a PU with a size of 2N×2N, a transform unit (TU) 404 can have a size flag setting of zero and a residual quad-tree (RQT) of 1 level. For a transform unit that corresponds to a PU with a size of N×N, the TU 404 can have a size flag setting of one and a residual quad-tree (RQT) of 2 levels.

The TU is the block size of a transform. For each PU, the transform can be performed on the prediction residuals using an RQT. For example, a residual block of each PU can be split into four sub-blocks for transforms and each sub-block can be further divided into four sub-blocks. A decision as to whether to further divide a block or sub-block can be performed using rate distortion optimization (RDO). For intra-frame coding, after a determination is made as to a transform size, the prediction for each sub-blocks can be determined again, e.g., when a transform is performed on one sub-block and reconstructed, the reconstructed pixels can be used to predict neighboring sub-blocks and the residuals of that sub-block can be re-generated.

Figure 5:
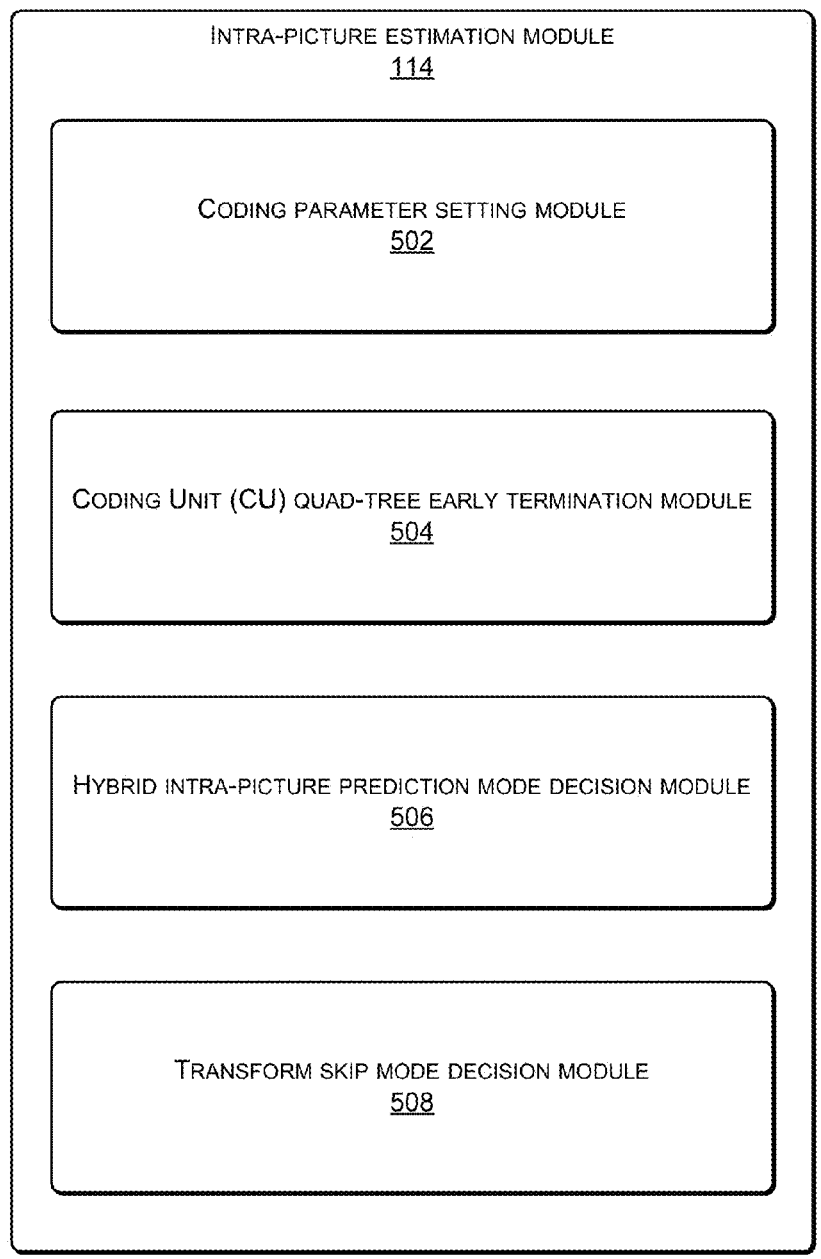
FIG. 5 is an illustrative architecture that includes a coding parameter setting module, a coding unit quad-tree early termination module, a hybrid intra-prediction mode decision module, and a transform skip mode decision module according to some implementations.

FIG. 5 is an illustrative architecture 500 that includes a coding parameter setting module, a coding unit quad-tree early termination module, a hybrid intra-prediction mode decision module, and a transform skip mode decision module according to some implementations. The intra-picture estimation module 114 can include various modules to reduce an amount of computations to be performed when performing intra-picture estimation, in which parts of an image are encoded relative to other parts of the image. For example, the intra-picture estimation module 114 can include a coding parameter setting module 502, a CU quad-tree early termination module 504, a hybrid intra-prediction mode decision module 506, and a transform skip mode decision module 508.

The coding parameter setting module 502 can be used to set coding parameters to reduce a computational complexity of performing intra-picture estimation. In HEVC, if a CU quad-tree is defined with a depth of four and a maximum CU size of 64×64, then for one CTU, a quad-tree with four layers and eighty-five nodes can be traversed. Large block sizes, such as 64×64 or 32×32 can be useful to improve the performance of inter-picture coding for high-resolution video by saving overhead bits. However, intra-picture coding is less sensitive to large block sizes, such as 64×64 or 32×32. Therefore, not using large CU sizes can have a relatively imperceptible effect on intra-picture coding performance as compared to using large CU sizes. In addition, in HEVC, the residual quad-tree (RQT) is primarily used to improve the performance of inter-picture coding, and has much less effect on intra-picture coding.

The coding parameter setting module 502 can set a maximum CU size of 16×16 and a maximum CU depth to 2. By setting the maximum CU size, two sizes of CUs, 16×16 and 8×8, can be used, thereby simplifying the coding tree structure. In addition, the RQT is not used. Instead, a TU with a size equal to a size of the PU can be used, thereby removing an extra RDO calculation based on TU size. For intra-picture coding, the transform block size may be less than or equal to a PU size. The TU quad-tree within a PU may be determined by another RDO process. Because RQT has less effect on intra-picture coding, removing the RQT, e.g., setting the TU size equal to PU size can saving extra RDO computations. For example, when PU=2N×2N, RQT has only level 1; and when PU=N×N, RQT has level 2 and for the first level the TU size flag is 1.

When dividing a CU into additional CUs (e.g., sub-CUs that are smaller than the CU), the CU quad-tree early termination module 504 can determine, whether further splitting a current CU may provide better performance. If a determination is made that further splitting a current CU may be better, the CU will be split into sub-CUs and whether this split is better or not than the original CU may be determined by RDO. For example, even when the CU quad-tree early termination module decides a CU can be split into smaller CUs, not splitting the CU may, in some cases, be better than splitting the CU. The RDO, rather than the early termination module, may decide whether to split a CU into smaller CUs. However, the early termination can skip some RDO computations. If a determination is made that further splitting a current CU will not provide better performance, the CU quad-tree early termination module 504 can terminate the traversal of the quad-tree to a next depth of a current sub-tree. In this way, a CU with relatively complex details can be further divided while a CU with relatively simple details can not be further divided because further division can not yield an improvement in image quality. The operation of the CU quad-tree early termination module 504 is described in more detail in FIGS. 6 and 7.

The hybrid intra-picture prediction mode decision module 506 can use a rough mode decision (RMD) algorithm to reduce a number of modes to be tested with RDO. The operation of the hybrid intra-picture prediction mode decision module 506 is described in more detail in FIG. 8.

The transform skip mode decision module 508 can determine when to perform a transform (e.g., a discrete cosine transform (DCT)) for compression and when to skip performing the transform. For example, a transform cannot be suitable for artificial (e.g., computer-generated) images but can be suitable for natural images (e.g., photographs or frames of a video). The operation of the transform skip mode decision module 508 is described in more detail in FIGS. 10 and 11.

Thus, the intra-picture estimation module 114 can include the coding parameter setting module 502, the CU quad-tree early termination module 504, the hybrid intra-prediction mode decision module 506, and the transform skip mode decision module 508. One or more of the modules 502, 504, 506, and 508 can be used to reduce the complexity of performing intra-picture estimation, thereby reducing computational intensity and therefore reducing a time to perform intra-picture estimation as compared to a conventional HEVC encoder.

Figure 6:
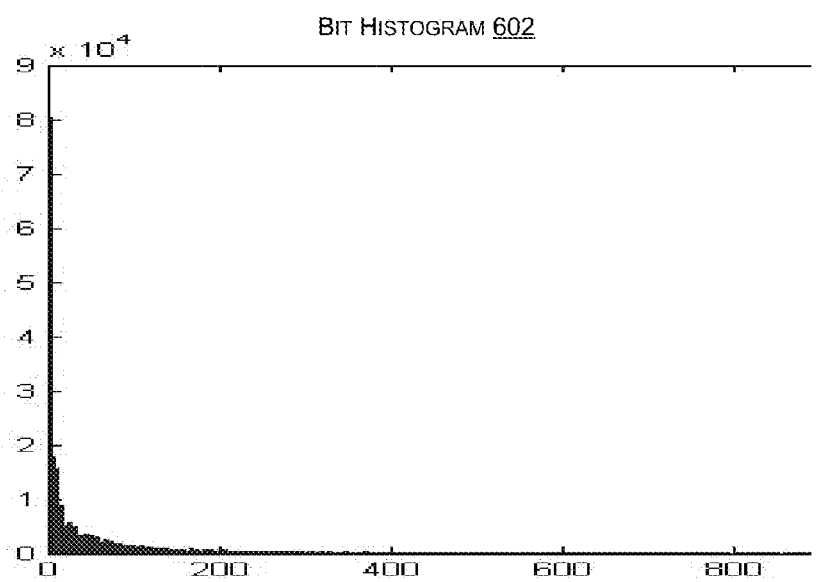
FIG. 6 illustrates bit histograms for 16×16 coding units and 8×8 coding units according to some implementations.
Figure 6:
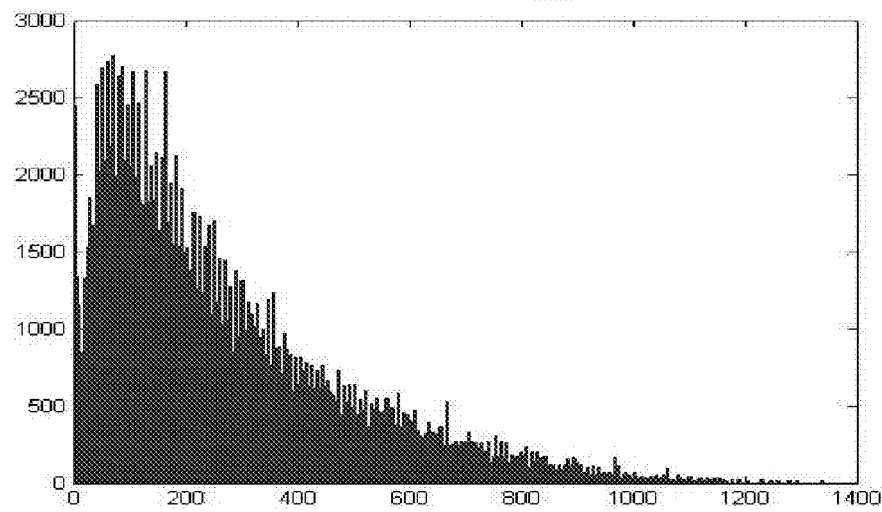

FIG. 6 illustrates bit histograms 600 for 16×16 coding units and 8×8 coding units according to some implementations. After the coding parameter setting module 502 selects parameters for intra-picture coding, RDO processes can be performed on blocks that have one of three sizes, e.g., a 16×16 PU can be used for a 16×16 CU and an 8×8 PU or a 4×4 PU can be used for an 8×8 CU. If the encoder determines that further splitting a current CU will not provide increased performance, the traversal for the next depth of current sub-tree can be terminated immediately to save the time to check all sub-nodes. Thus, after finishing 16×16 CU coding, various criteria that are described below can be used to determine whether the performance of a current CU is sufficient or whether to perform further division of the current CU. A similar decision can be performed after completing an 8×8 PU check for an 8×8 CU to determine whether a 4×4 PU should be tested. Let R denote a range of all pixel values in a CU:

$$R = \max_{pixel} - \min_{pixel} \quad (1)$$

R can be viewed as representing a smoothness of a current CU. When the current CU has a relatively low value of R (e.g., less than 31), the current CU can be considered a smooth block. In addition, a larger sized CU (e.g., 16×16) can be suitable for representing smooth areas of an image while smaller sized CUs (e.g., 8×8 or 4×4) can be suitable for representing detailed areas of an image. Thus, if R is low, the current CU can not be further split into sub-CUs.

Let Tb denote a number of bits to code a current CU. Bit histogram 602 and bit histogram 604 illustrate a relationship between Tb and whether to skip traversal of sub-blocks. The bit histogram 602 illustrates a distribution of Tb when a 16×16 sized CU is a suitable CU while bit histogram 604 illustrates a distribution of Tb when a 16×16 sized CU is not a suitable CU. For a CU that uses relatively few coding bits, the performance (e.g., quality) of a 16×16 CU can be at least equal to and can, in some cases, outperform dividing the CU into sub-CUs and using the sub-CUs. Thus, for a 16×16 sized CU that uses relatively few coding bits, the CU can not be further split into four smaller sub-CUs because splitting the CU into smaller sub-CUs can not yield an improvement in quality.

Thus, based on bit histograms 602 and 604, R and/or Tb can be used to determine when to terminate traversal of a CU quad-tree. An example process for using R and/or Tb to determine when to terminate traversal of a CU quad-tree is illustrated in FIG. 7.

Example Processes

In the flow diagrams of FIGS. 7, 8, 10, 11, 12, and 13 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 700, 800, 1000, 1100, 1200, and 1300 are described with reference to the architectures 100, 200, 300, 400, and 500 as described above, although other models, frameworks, systems and environments can implement these processes.

Figure 7:
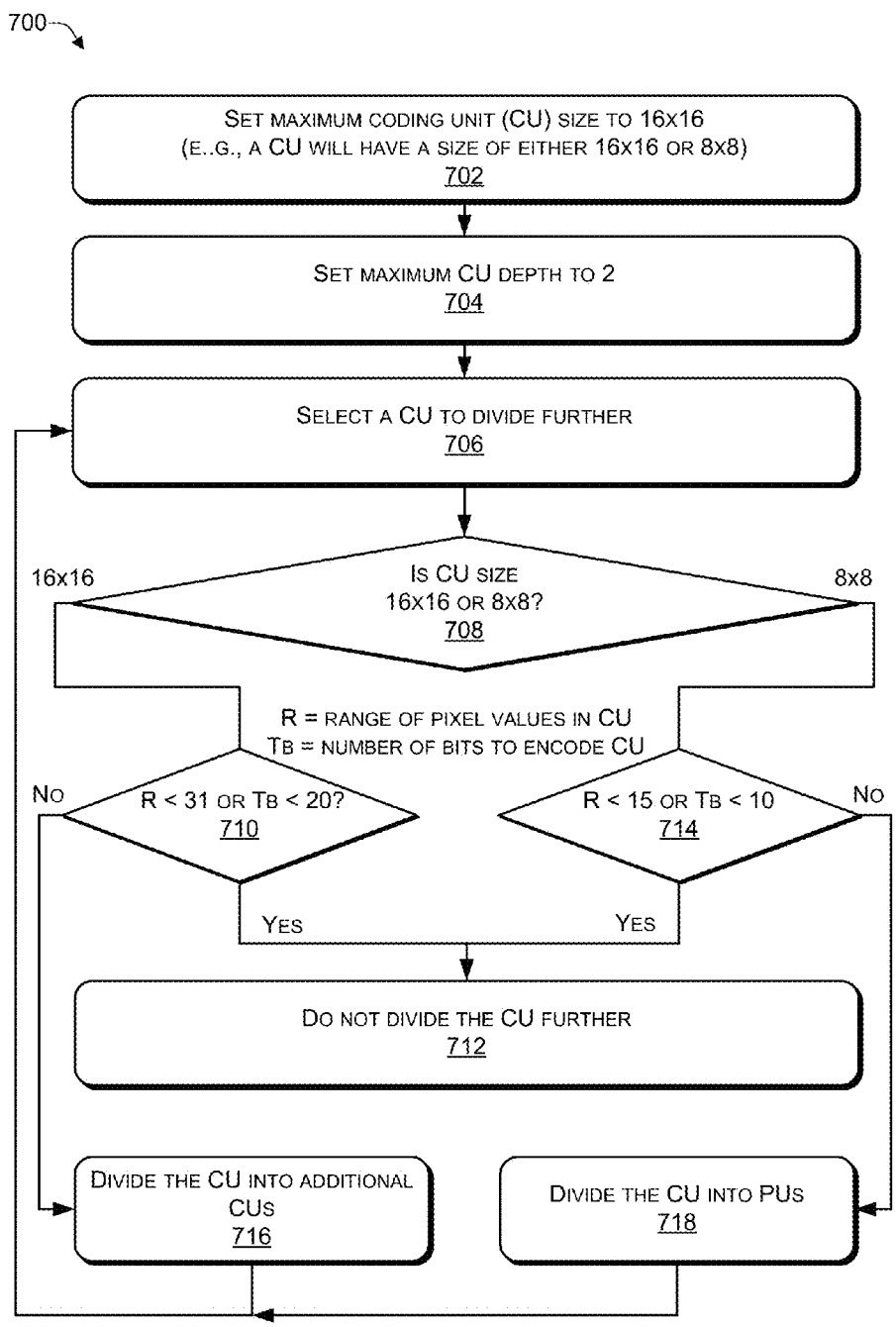
FIG. 7 is a flow diagram of an example process for a coding unit quad-tree early termination according to some implementations.

FIG. 7 is a flow diagram of an example process 700 for a coding unit quad-tree early termination according to some implementations. The process 700 can be performed by the intra-picture estimation module 114, the coding parameter setting module 502, and/or the CU quad-tree early termination module 504 of FIG. 5.

At 702, a maximum CU size can be set to 16×16. Thus, when coding an image, such as the image 102 of FIG. 1, a CU will have a size of either 16×16 or 8×8 pixels.

At 704, a maximum CU depth can be set to two. Thus, a topmost CU (e.g., CTU) can have no more than two levels of hierarchy in a corresponding quad-tree.

At 706, a CU (e.g., a current CU) can be selected to divide further. For example, a quad-tree corresponding to the current CU can be traversed.

At 708, a determination can be made as to whether a size of the current CU is 16×16 or 8×8.

In response to determining that the CU size is 16×16, at 708, a determination is made whether a range R of all pixel values in the CU is less than a first predetermined amount (e.g., 31) or whether a number of bits Tb to code the CU is less than a second predetermined amount (e.g., 20), at 710.

In response to determining that the range R of all pixel values in the CU is less than the first predetermined amount or the number of bits Tb to code the CU is less than the second predetermined amount, at 710, the traversal of the CU quad-tree can be terminated, such that the CU is not further divided into additional CUs, at 712.

In response to determining that the range R of all pixel values in the CU is greater than or equal to the first predetermined amount and the number of bits Tb to code the CU is greater than or equal to the second predetermined amount, at 710, the CU can be divided into additional CUs, at 716, and the process can proceed to select another CU, at 706.

In response to determining that the CU size is 8×8, at 708, a determination is made whether a range R of all pixel values in the CU is less than a third predetermined amount (e.g., 15) or whether a number of bits Tb to code the CU is less than a fourth predetermined amount (e.g., 10), at 714.

In response to determining that the range R of all pixel values in the CU is less than the third predetermined amount (e.g., 15) or the number of bits Tb to code the CU is less than the fourth predetermined amount (e.g., 10), at 714, the traversal of the CU quad-tree can be terminated, such that the CU is not divided further, at 712.

In response to determining that the range R of all pixel values in the CU is greater than or equal to the third predetermined amount and the number of bits Tb to code the CU is greater than or equal to the fourth predetermined amount, at 714, the CU may be divided into 4×4 PUs, at 718, and the process can proceed to select another CU, at 706.

In some cases, the coding parameter setting module 502 can perform 702 and 704 of the process 700 while the CU quad-tree early termination module 504 of FIG. 5 can perform 706, 708, 710, 712, 714, 716, and 718 of the process 700.

Thus, setting a maximum CU size to 16×16 and a maximum depth to 2 can result in reducing an amount of computation to traverse CU quad-trees. In addition, traversal of a CU quad-tree to divide a CU into additional CUs can be terminated when the CU does not contain a large range of pixel values or a large number of bits are not used to encode the CU. For example, for a 16×16 size CU, the threshold for R may be between 25 and 35, which means R<R0 and 25<R0<35 can yield similar results to R0=31. As another example, for an 8×8 size CU, the threshold for R may be between 13 and 17, which means R<R0 and 13<R0<17 can yield similar results to R0=15. By terminating traversal of a CU quad-tree when splitting a CU into sub-CUs would result in little or no improvement in quality, an amount of computation used to traverse CU quad-trees can be reduced. For example, in some implementations, for a 16×16 CU, R<31 or Tb<20 may be used for early termination and for an 8×8 CU, R<15 or Tb<10 may be used for early termination.

Figure 8:
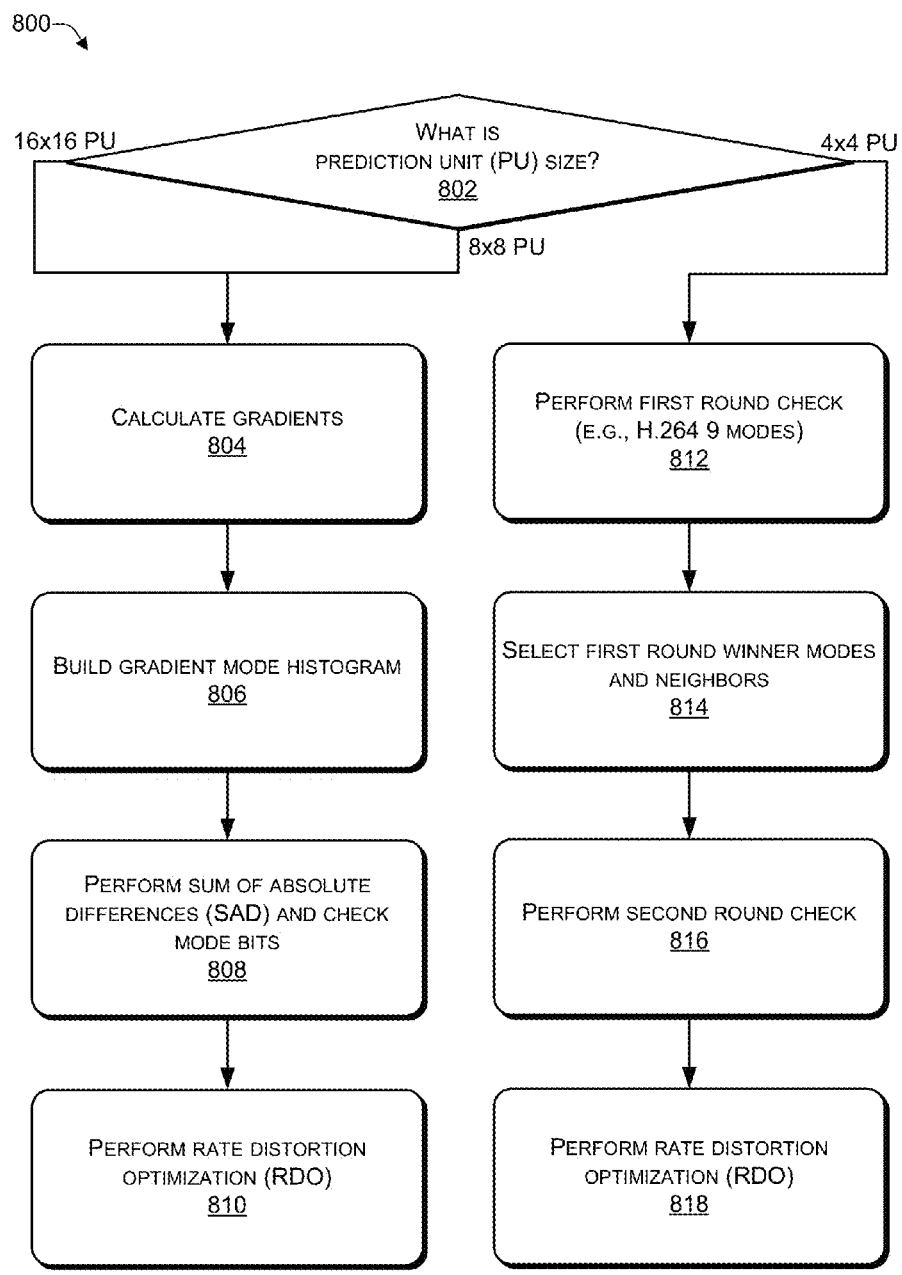
FIG. 8 is a flow diagram of an example process that includes a hybrid intra-prediction mode decision module according to some implementations.

FIG. 8 is a flow diagram of an example process 800 that includes a hybrid intra-prediction mode decision module according to some implementations. The process 800 can be performed by the intra-picture estimation module 114 and/or the hybrid intra-picture prediction mode decision module 506 of FIG. 5. The process 800 can be performed after an image (e.g., the image 102 of FIG. 1) has been divided into CUs and PUs.

In some cases, an intra-picture prediction mode decision process can use a rough mode decision (RMD) algorithm to reduce a number of modes needed to be tested with RDO. The prediction of a block is performed along a certain direction. The modes are the prediction directions, all of which cover a 180 degree angle. The modes may be traversed using RDO to select one with minimum rate distortion cost. Prediction modes can first be tested using a sum of absolute transformed differences (SATD) and bits of mode encoding. Candidate modes can be modes with the smallest costs that are selected as candidates from which to select the mode that will be used. After adding the most probable modes (MPMs) derived from neighboring blocks as candidates, the candidate modes can be tested using RDO. The candidate mode with the smallest rate distortion cost can be selected as the final prediction mode for a current PU. One disadvantage of this approach is that RDO is performed several times. For an 8×8 or 4×4 size PU, the number of candidate modes for RDO can be as high as eight, in addition to two MPMs. Because RDO is typically time-consuming and computationally intensive process, reducing a number of times RDO is performed can reduce a time and computational resources used to perform intra-picture estimation.

The intra-picture prediction mode decision process can be simplified to reduce both a number of predictions and a number of times RDO is determined. A gradient-based algorithm can be used to select candidate modes for 16×16 and 8×8 PUs. The candidate mode of a current PU can be related to a gradient mode distribution associated with the PU. The best prediction can be in a direction with the least variation in pixel value, which is the perpendicular direction of the gradient. Because a gradient is defined at a pixel level while a prediction direction is defined at the PU level, a gradient mode histogram can be created for each PU.

The gradients for each PU can include an amplitude and a direction of each pixel that is calculated using a Sobel operator. A perpendicular direction of each gradient that represents a least variation direction can be mapped to an intra-angular prediction mode. A sum of amplitudes of all gradients with a same prediction mode can be calculated to create a gradient mode histogram. For example, up to eight modes with the largest amplitudes can be selected based on the gradient mode histogram. The gradient mode histogram describes the distributions of local edge directions, where the x-axis is a prediction mode defined in HEVC and the y-axis is the frequency of that mode weighted by amplitudes of local gradients. The eight modes with the largest y will be selected as the candidate modes for further mode check using SAD. The candidate modes, DC and the planar mode, can be checked using sum of absolute differences (SAD) and mode bits. The mode bits are the estimated bits for coding a prediction mode. The total cost of a prediction mode is estimated by C=SAD/SATD+λ·Rmode where Rmode denotes the mode bits and λ is the parameter related with the quantization parameter (QP). DC is a prediction which uses the average of reference pixels as the prediction. SAD can be used instead of SATD because determining SATD is more computationally intensive relative to determining SAD. A candidate mode can be chosen by SAD and mode bits to compete with the MPMs for the RDO that will be determined. On the whole, the prediction mode decision process for a 16×16/8×8 block can be split into three steps. First, build a gradient mode histogram and select 8 candidates modes with the largest weighted frequency. Second, choose one from the 8 candidate modes, DC and planar mode by minimizing the cost C=SAD+λ·Rmode. Third, the one chosen by the second step plus the most probable modes (MPMs) derived from modes of neighboring blocks are checked by RDO to select the best mode for the PU. There may be one or two MPMs depending on modes of neighboring blocks. In this way, computationally intensive operations can be reduced because at most ten candidate modes can be tested using SAD and mode bits and the number of modes for RDO can be reduced to no more than three.

At 802, a determination is made as to a size of a PU. For example, in FIG. 5, the PU size may be determined by RDO. The prediction mode decision process may be specific to a particular PU, which is nested in the CU/PU mode decision process.

In response to determining that the PU has a size of 16×16 or 8×8, at 802, gradients can be calculated, at 804. At 806, a gradient mode histogram can be built. At 808, a sum of absolute differences (SAD) can be performed and mode bits can be checked. At 810, rate distortion optimization can be performed.

In response to determining that the PU has a size of 4×4, at 802, a first round check can be performed, at 812. At 814, first round winners and corresponding neighbors can be selected. At 816, a second round check can be performed. At 818, rate distortion optimization can be performed.

For a 4×4 PU, there can be an insufficient number of pixels to determine gradients to build an accurate gradient mode histogram. Therefore, a hierarchical prediction scheme can be used for a 4×4 PU because neighboring angular modes can have a similar rate distortion cost. Angular mode is a type of prediction mode. Angular modes may have corresponding directions along which the prediction is performed. The process 800 can perform two rounds of rough mode decisions. In the first round, nine candidate modes can be tested and three modes can be selected based on the cost of SAD and mode bits. For winner modes (e.g., selected from the candidate modes) of the first round, 4 modes neighboring on both sides, the DC and the planar mode, can be tested again in the second round using SAD and mode bits (after duplicate elimination). In this way, only 9+(3*4)+2=23 predictions can be performed for one 4×4 PU before RDO. After two rounds of prediction, one candidate mode can be selected for RDO together with MPMs, similar to the 16×16 and 8×8 size PUs. For chroma intra-picture prediction, the candidate mode of corresponding luma PU can be used for coding directly due to the strong correlation between luma and chroma components. There are 33 angular modes which angularly cover 180 degrees. The DC and Planar modes correspond to 1 and 0, respectively. The two rounds of rough mode decisions are a coarse to fine process. The first round chooses 9 modes (e.g., 2, 6, 10, 14, 18, 22, 26, 30 and 34). By comparing their costs C=SAD+λ·Rmode, the three best (e.g., lowest cost) modes may be selected. In the second round, the 4 angularly neighboring modes for each of the three modes from the first round (e.g. 24, 25, 27, 28 if 26 is one of the three), the DC and the planar mode are tested using C=SAD+λ·Rmode. After the two rounds, one best mode is selected. The best mode and MPMs derived from neighboring blocks are checked by RDO to select one mode as the mode for the PU.

Figure 9:
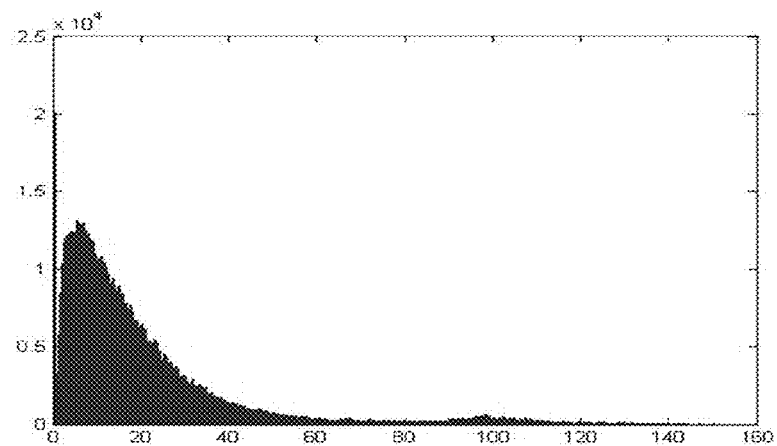
FIG. 9 illustrates spatial frequency measure with transform and without transform according to some implementations.
Figure 9:
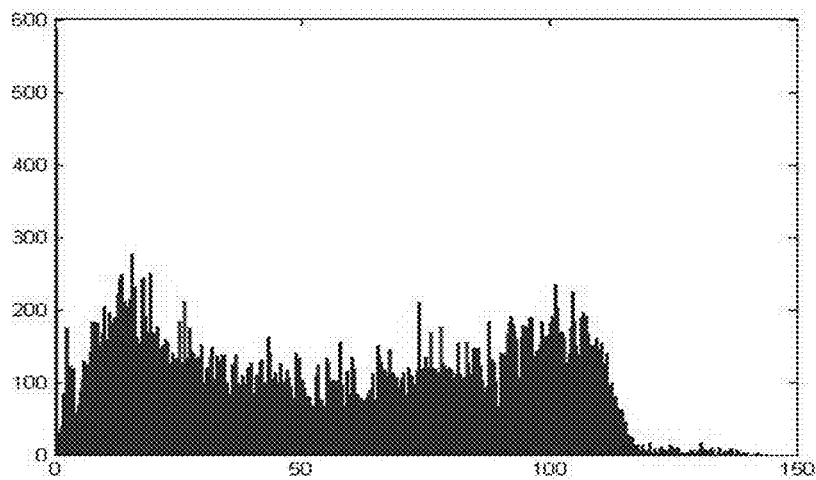

FIG. 9 illustrates spatial frequency measurements 900 with transform and without transform according to some implementations. A correlation among pixels in one block can be removed by a spatial transform. However, some transforms, such as a discrete cosine transform (DCT), can be unsuitable for some artificial images that include text and/or graphics because the spectral energy of blocks of artificial images can not converge to low frequencies as compared to natural images. Therefore, a transform skip mode can be used by the HEVC encoder 106 for 4×4 PUs to accommodate artificial images. An RDO can be performed for a 4×4 PU under certain conditions while the RDO can be skipped for other conditions. Because the text and/or graphics of artificial images can have different characteristics as compared to natural images, e.g. fewer color numbers, sparse in spatial domain and/or high frequencies, a number of RDO performed can be reduced.

Spatial frequency measure (SFM) can be used to analyze a difference between blocks of a natural image and blocks of an artificial (e.g. computer generated) image. SFM can be determined using original pixel values and can be defined as $$SFM = \sqrt{R^2 + C^2} \quad (2)$$

where $$R = \sqrt{\frac{1}{Mn}\sum_{j=0}^{N-1}\sum_{i=0}^{M-1}(x_{i,j} - x_{i-1,j})^2} \quad (3)$$

and $$C = \sqrt{\frac{1}{MN}\sum_{i=0}^{M-1}\sum_{j=0}^{N-1}(x_{i,j} - x_{i,j-1})^2} . \quad (4)$$

FIG. 9 illustrates a distribution of SFM for two types of 4×4 PUs, SFM encoding with transform 902 and SFM encoding without transform 904. FIG. 9 illustrates that blocks with transforms tend to have a lower SFM value because SFM indicates an activity level of an image block. Thus, when SFM is relatively small, indicating that the block is relatively smooth and has few high frequency components, a transform can be used to converge energy. The process for determining when to perform a transform and when to skip performing a transform based on the SFM is described in more detail in FIG. 10.

Figure 10:
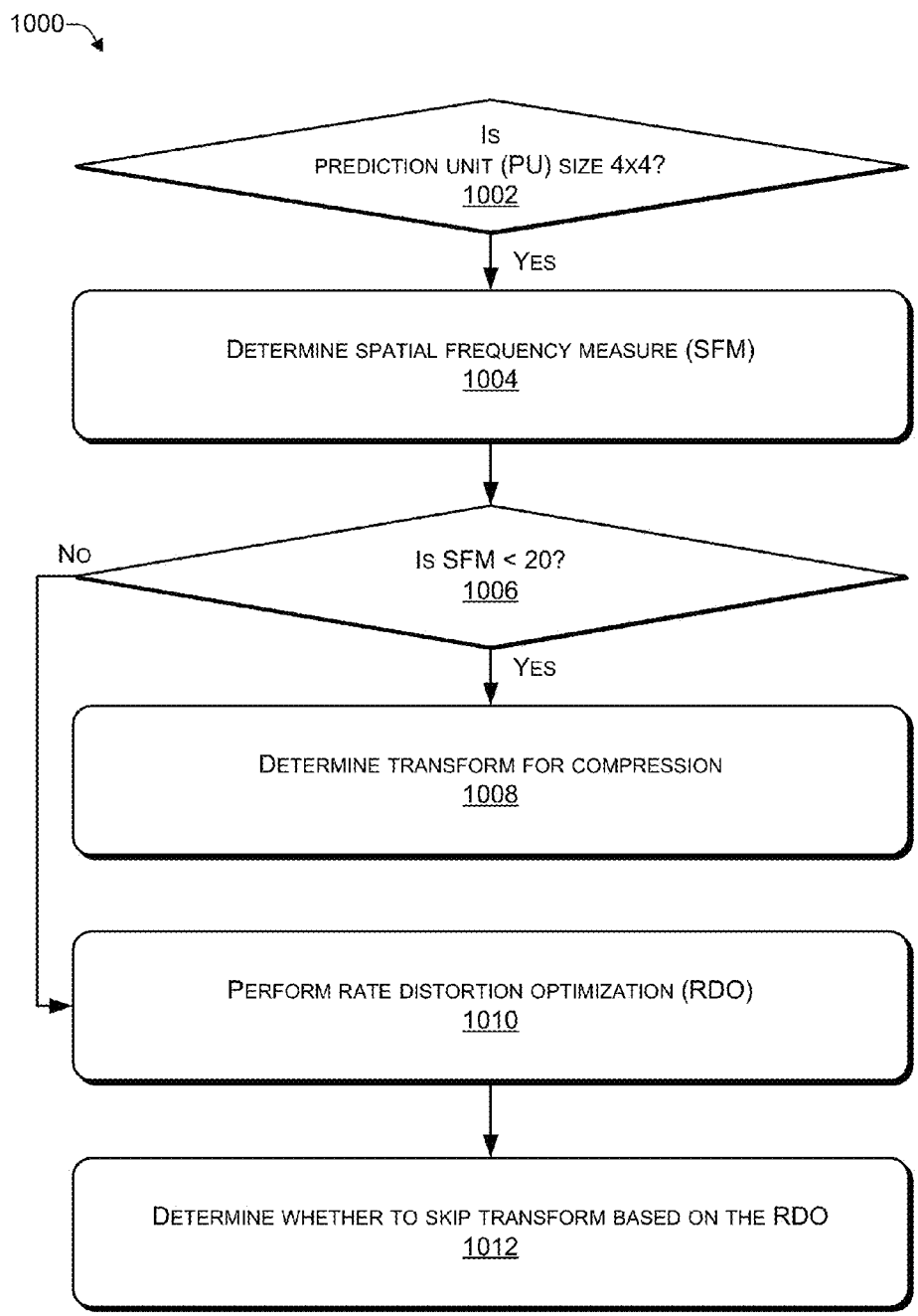
FIG. 10 is a flow diagram of an example process that includes a transform skip mode decision module according to some implementations.

FIG. 10 is a flow diagram of an example process 1000 that includes a transform skip mode decision module according to some implementations. The process 1000 can be performed by the intra-picture estimation module 114 and/or the transform skip mode decision module 508 of FIG. 5.

At 1002, a size of a PU is determined. If the PU has a size greater than 4×4, then no further action is taken. In response to determining that the size of the PU is 4×4, at 1002, a spatial frequency measure is determined, at 1004. At 1006, a determination is made whether the SFM is less than twenty. In response to determining that the SFM is less than twenty, at 1006, a transform is determined for compressing the PU, at 1008. In response to determining that the SFM is greater than or equal to twenty, at 1006, an RDO can be performed, at 1010. At 1012, based on the RDO, a determination can be made as to whether to skip performing a transform.

Based on the distribution for SFM encoding with transform 902 and the distribution for SFM encoding without transform 904, the transform skip mode decision module 508 can determine an SFM for each 4×4 PU. If SFM<20, a transform for compression is performed. If SFM is >=20, then an RDO is performed and a determination is made whether to skip the transformation based on the RDO.

Thus, the intra-picture estimation module 114 can use one or more of the coding parameter setting module 502, the CU quad-tree early termination module 504, the hybrid intra-picture prediction mode decision module 506, or the transform skip mode decision module 508 of FIG. 5 to reduce a computational intensity of encoding the image 102 using HEVC coding. An optimized HEVC image encoder as described herein can result in an average reduction of over 80% encoding time as compared with a conventional HEVC encoder.

Figure 11:
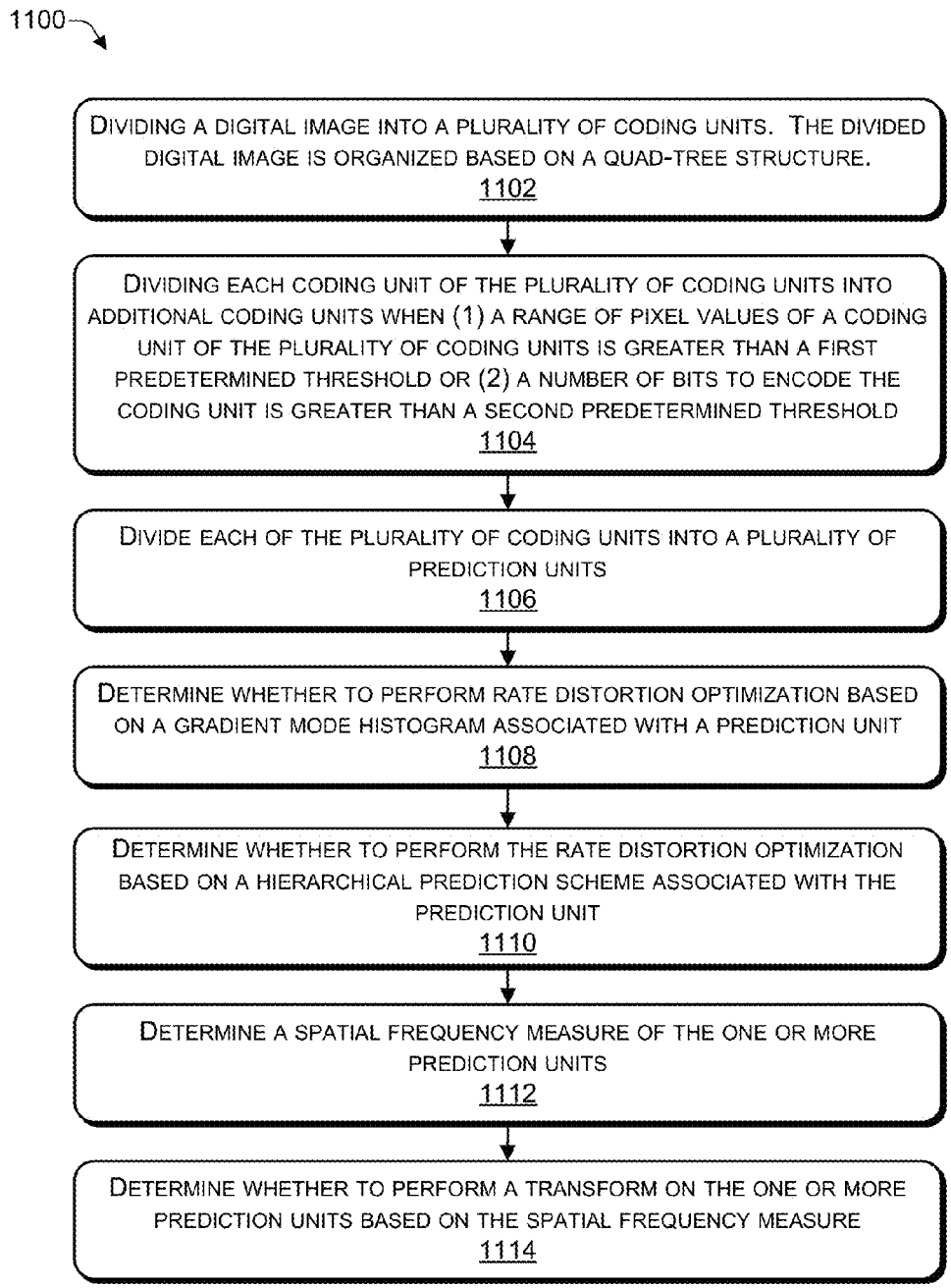
FIG. 11 is a flow diagram of an example process that includes dividing a digital image into a plurality of coding units that are organized based on a quad-tree structure according to some implementations.

FIG. 11 is a flow diagram of an example process 1100 that includes dividing a digital image into a plurality of coding units that are organized based on a quad-tree structure according to some implementations. The process 1100 can be performed by the intra-picture estimation module 114 of FIG. 1. The process 1100 includes dividing a 16×16 CU into 8×8 CUs and dividing an 8×8 PU into 4×4 PUs.

At 1102, a digital image can be divided into a plurality of coding units. The divided digital image can be organized based on a quad-tree structure. For example, in FIG. 2, the image 102 can be divided into CTUs 202, 204, 206, 208, 210, 212, 214, 216, 218, 220, 222, and 224. At least some of the CTUs 202, 204, 206, 208, 210, 212, 214, 216, 218, 220, 222, and 224 can be divided, as illustrated in FIG. 3, into coding units 304, 306, 308, and 310 organized according to the quad-tree structure 312.

At 1104, each coding unit of the plurality of coding units can be divided into additional coding units when (1) a range of pixel values of a coding unit of the plurality of coding units is greater than a first predetermined threshold and (2) a number of bits to encode the coding unit is greater than a second predetermined threshold. For example, in FIG. 7, when a coding unit has a size of 16×16 pixels, the coding unit can be divided further when (1) the range of pixel values of the of the plurality of coding units is greater than thirty and (2) the number of bits to encode the coding unit is greater than nineteen. As another example, when a size of a coding unit is 8×8 pixels, the coding unit can be divided further when (1) the range of pixel values of the of the plurality of coding units is greater than fourteen and (2) the number of bits to encode the coding unit is greater than nine.

At 1106, at least one coding unit of the plurality of coding units can be divided into a plurality of prediction units. For example, in FIG. 3, the coding unit 310 can be divided into the predictions units 314, 316, 318, and 320.

At 1108, a determination can be made whether to perform rate distortion optimization based on a gradient mode histogram associated with a prediction unit. For example, in FIG. 8, a gradient mode histogram can be built, at 806, and used to determine to whether to perform the rate distortion optimization, at 810.

At 1110, a determination can be made whether to perform rate distortion optimization based on a hierarchical prediction scheme associated with the prediction unit. For example, in FIG. 8, the hierarchical prediction scheme of 812, 814, and 816 can be used to determine to whether to perform the rate distortion optimization, at 818.

At 1112, a spatial frequency measure of the one or more prediction units can be determined. At 1114, a determination can be made whether to perform a transform on the one or more prediction units based on the spatial frequency measure. For example, in FIG. 10, a spatial frequency measure can be performed 1004, and used to determine whether to perform a transform, at 1006.

Figure 12:
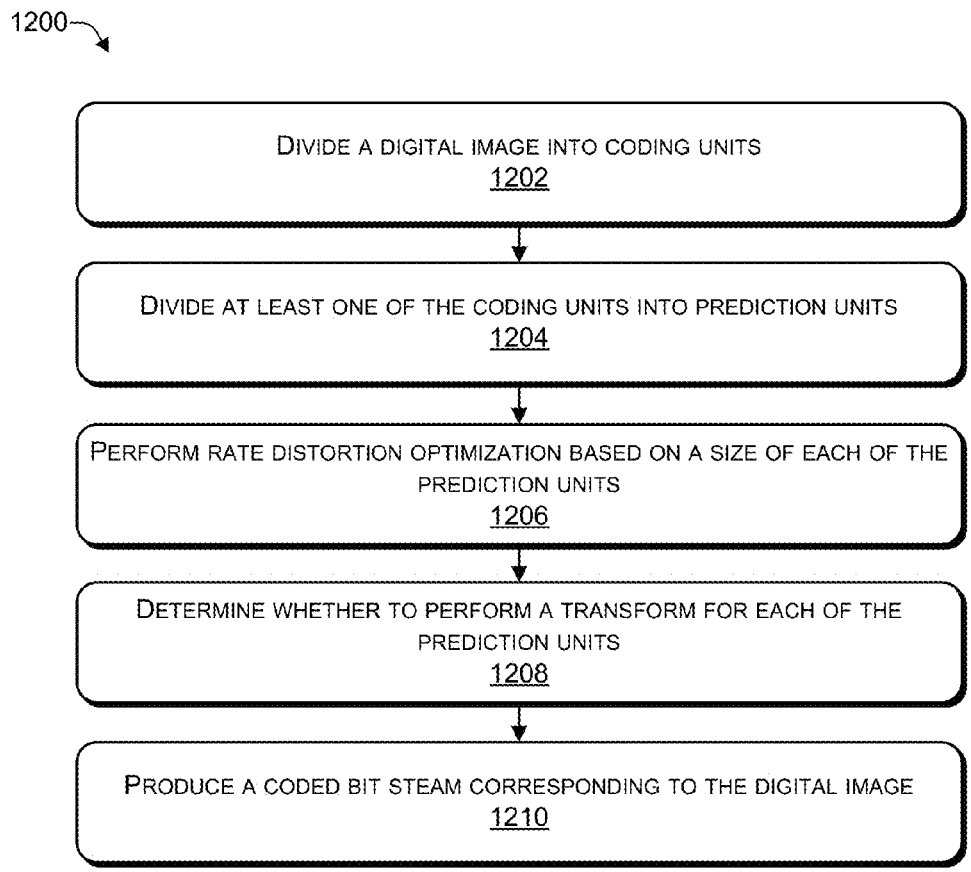
FIG. 12 is a flow diagram of an example process that includes initiating dividing a digital image into a plurality of coding units according to some implementations.

FIG. 12 is a flow diagram of an example process 1200 that includes initiating dividing a digital image into a plurality of coding units according to some implementations. The process 1200 can be performed by the intra-picture estimation module 114 of FIG. 1. The process 1200 includes dividing a 16×16 CU into 8×8 CUs and dividing an 8×8 PU into 4×4 PUs.

At 1202, a digital image can be divided into coding units. For example, in FIG. 2, the image 102 can be divided into CTUs 202, 204, 206, 208, 210, 212, 214, 216, 218, 220, 222, and 224. At least some of the CTUs 202, 204, 206, 208, 210, 212, 214, 216, 218, 220, 222, and 224 can be divided, as illustrated in FIG. 3, into coding units 304, 306, 308, and 310 organized according to the quad-tree structure 312.

At 1204, at least one of the coding units can be divided into prediction units. For example, in FIG. 3, the coding unit 310 can be divided into the predictions units 314, 316, 318, and 320.

At 1206, rate distortion optimization can be performed based on a size of each of the prediction units. For example, in FIG. 8, a gradient mode histogram can be built, at 806, and used to determine to whether to perform the rate distortion optimization, at 810.

At 1208, a determination can be made whether to perform a transform for each of the prediction units. For example, the process 1000 of FIG. 10 can be used to determine whether to perform a transform for each of the prediction units.

At 1210, a coded bit stream corresponding to the digital image can be produced. For example, in FIG. 1, the HEVC encoder 106 can produce the coded bit stream 104 corresponding to the image 102. The coded bit stream 104 can be a compressed representation of the image 102.

Figure 13:
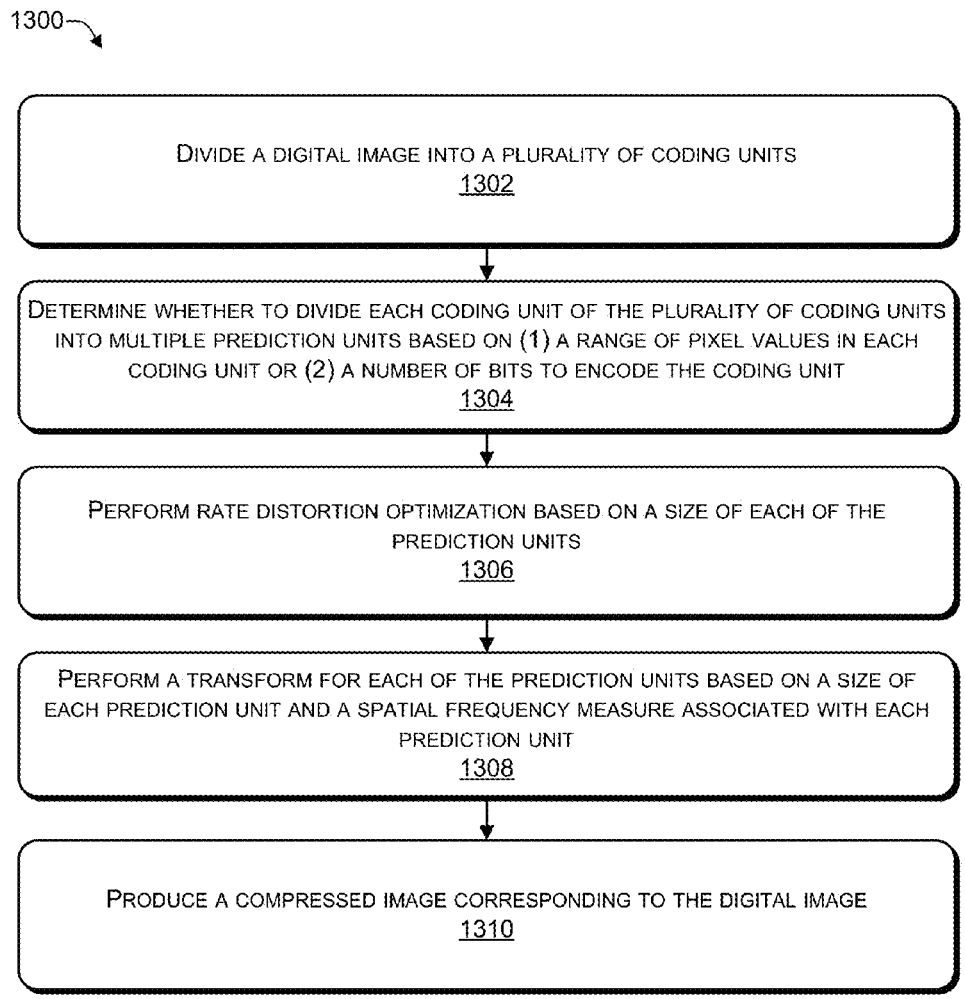
FIG. 13 is a flow diagram of an example process that includes performing rate distortion optimization based on a size of each prediction unit according to some implementations.

FIG. 13 is a flow diagram of an example process 1300 that includes performing rate distortion optimization based on a size of each prediction unit according to some implementations. The process 1300 can be performed by the intra-picture estimation module 114 of FIG. 1. The process 1300 includes dividing a 16×16 CU into 8×8 CUs and dividing an 8×8 PU into 4×4 PUs.

At 1302, a digital image can be divided into a plurality of coding units. For example, in FIG. 2, the image 102 can be divided into CTUs 202, 204, 206, 208, 210, 212, 214, 216, 218, 220, 222, and 224. At least some of the CTUs 202, 204, 206, 208, 210, 212, 214, 216, 218, 220, 222, and 224 can be divided, as illustrated in FIG. 3, into coding units 304, 306, 308, and 310 organized according to the quad-tree structure 312.

At 1304, a determination is made as to whether to divide each coding unit of the plurality of coding units into multiple prediction units based on (1) a range of pixel values of a coding unit of the plurality of coding units is greater than a first predetermined threshold and (2) a number of bits to encode the coding unit is greater than a second predetermined threshold. For example, in FIG. 7, when a coding unit has a size of 16×16 pixels, the coding unit can be divided further when (1) the range of pixel values of the of the plurality of coding units is greater than thirty and (2) the number of bits to encode the coding unit is greater than nineteen. When a size of a coding unit is 8×8 pixels, the coding unit can be divided further when (1) the range of pixel values of the plurality of coding units is greater than fourteen and (2) the number of bits to encode the coding unit is greater than nine. For a 8×8 CU, the CU may be divided into an 8×8 PU or 4×4 PUs. The smallest CU is 8×8. For a 16×16 CU, the PU size may be 16×16. The early termination module may be applied to both the CU and PU mode decision.

At 1306, based on a size of each of the prediction units, rate distortion optimization can be performed. For example, in FIG. 8, the process 800 can be used to determine whether to perform rate distortion optimization.

At 1308, a transform for each of the prediction units can be performed based on a size of each prediction unit and a spatial frequency measure associated with each prediction unit. For example, in FIG. 10, a spatial frequency measure can be performed 1004, and used to determine whether to perform a transform, at 1006.

At 1310, a compressed image corresponding to the digital image can be produced. For example, in FIG. 1, the HEVC encoder 106 can produce the coded bit stream 104 corresponding to the image 102. The coded bit stream 104 can be a compressed representation of the image 102.

Example Computing Device and Environment

Figure 14:
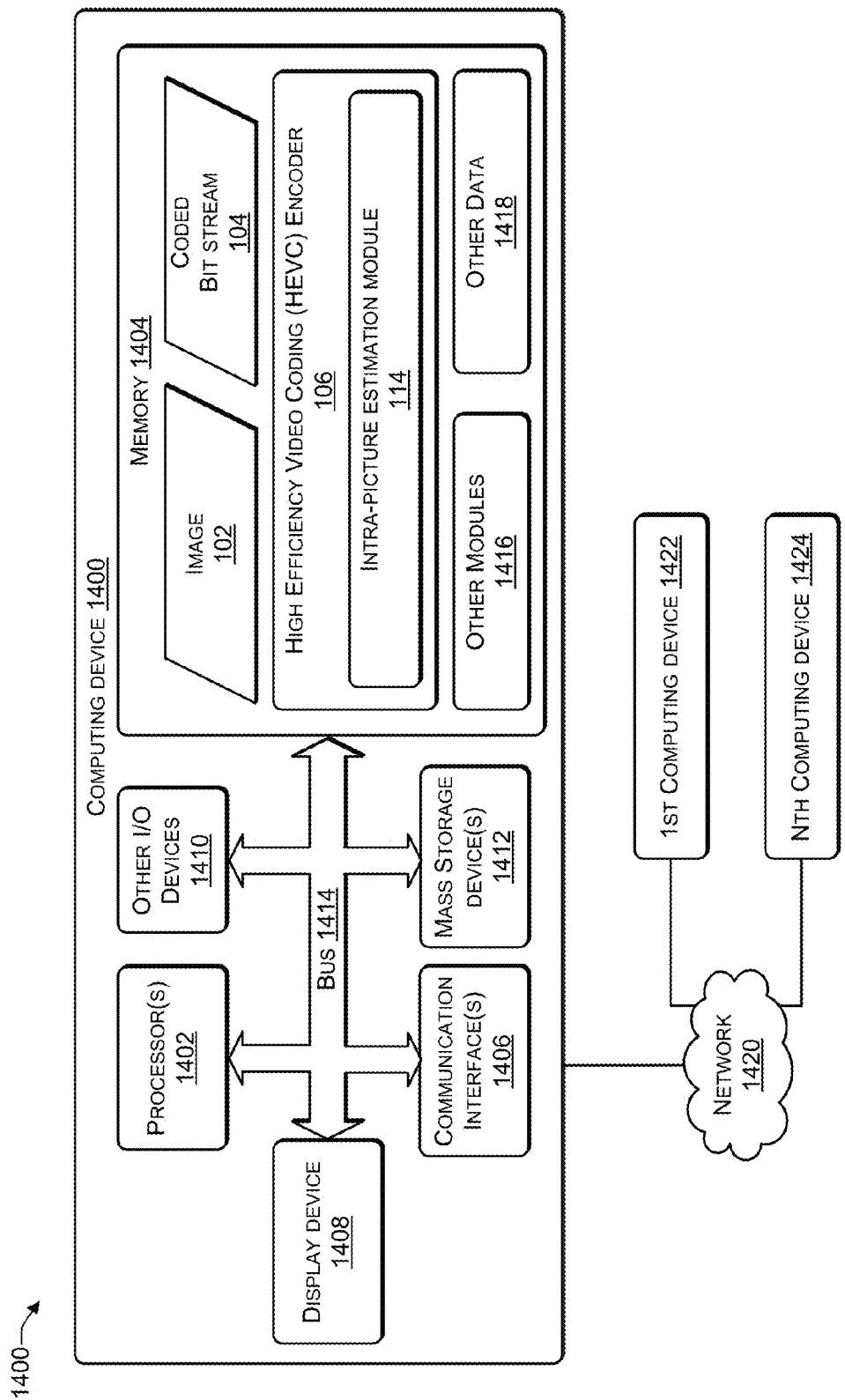
FIG. 14 illustrates an example configuration of a computing device and environment that can be used to implement the modules and functions described herein.

FIG. 14 illustrates an example configuration of a computing device 1400 and environment that can be used to implement the modules and functions described herein. For example, the computing device 1400 can represent a mobile computing device, such as a tablet computing device, a mobile phone, a camera (e.g., a still picture and/or video camera), another type of portable electronics devices, or any combination thereof. As another example, the computing device 1400 can represent a server or a portion of a server used to host a search engine capable of searching and displaying images.

The computing device 1400 can include one or more processors 1402, a memory 1404, communication interfaces 1406, a display device 1408, other input/output (I/O) devices 1410, and one or more mass storage devices 1412, able to communicate with each other, such as via a system bus 1414 or other suitable connection.

The processors 1402 can be a single processing unit or a number of processing units, all of which can include single or multiple computing units or multiple cores. The processor 1402 can be implemented as one or more microprocessors, microcomputers, microcontrollers, digital signal processors, central processing units, state machines, logic circuitries, and/or any devices that manipulate signals based on operational instructions. Among other capabilities, the processor 1402 can be configured to fetch and execute computer-readable instructions stored in the memory 1404, mass storage devices 1412, or other computer-readable media.

Memory 1404 and mass storage devices 1412 are examples of computer storage media for storing instructions, which are executed by the processor 1402 to perform the various functions described above. For example, memory 1404 can generally include both volatile memory and non-volatile memory (e.g., RAM, ROM, or the like). Further, mass storage devices 1412 can generally include hard disk drives, solid-state drives, removable media, including external and removable drives, memory cards, flash memory, floppy disks, optical disks (e.g., CD, DVD), a storage array, a network attached storage, a storage area network, or the like. Both memory 1404 and mass storage devices 1412 can be collectively referred to as memory or computer storage media herein, and can be capable of storing computer-readable, processor-executable program instructions as computer program code that can be executed by the processor 1402 as a particular machine configured for carrying out the operations and functions described in the implementations herein.

Although illustrated in FIG. 14 as being stored in memory 1404 of computing device 1400, the authoring module 114, the generation module 116, the presentation module 118, the presentation 120, other modules 1416 and other data 1418, or portions thereof, can be implemented using any form of computer-readable media that is accessible by the computing device 1400. As used herein, "computer-readable media" includes computer storage media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication media.

The computing device 1400 can also include one or more communication interfaces 1406 for exchanging data with other devices, such as via a network, direct connection, or the like, as discussed above. The communication interfaces 1406 can facilitate communications within a wide variety of networks and protocol types, including wired networks (e.g., LAN, cable, etc.) and wireless networks (e.g., WLAN, cellular, satellite, etc.), the Internet and the like. Communication interfaces 1406 can also provide communication with external storage (not shown), such as in a storage array, network attached storage, storage area network, or the like.

A display device 1408, such as a monitor can be included in some implementations for displaying information and images to users. Other I/O devices 1410 can be devices that receive various inputs from a user and provide various outputs to the user, and can include a keyboard, a remote controller, a mouse, a printer, audio input/output devices, and so forth.

Memory 1404 can include modules and components to implement an HEVC encoder according to the implementations described herein. The memory 1404 can include multiple modules (e.g., the HEVC encoder 106, and the modules 114, 502, 504, 506, and/or 508 of FIG. 5) to perform various functions associated with HEVC encoding. The memory 1404 can include the image 102 and the coded bit stream 104 (e.g., a compressed representation of the image 102). The memory 1404 can also include other modules 1416 that implement other features and other data 1418 that includes intermediate calculations and the like. The other modules 1416 can include various software, such as an operating system, drivers, communication software, a search engine, a database for images, or the like.

The computing device 1400 can use a network 1420 to communicate with multiple computing devices, such as a first computing device 1422 to an Nth computing device 1424. For example, the computing device 1400 can be capable of capturing digital images, compressing the digital images using the HEVC encoder, and sending the compressed digital images to the N computing devices 1422 to 1424 via the network 1420. As another example, the computing device 1400 can host a search engine that is capable of search and indexing multiple websites. In response to a search query, the computing device 1400 can display images that have been compressed using the HEVC encoder 106.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and can be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein can be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. One or more computer-readable memory or storage devices having stored thereon computer-executable instructions for causing a computing system programmed thereby to perform operations comprising:
    encoding an image using a video encoder, including, for a current coding unit (CU) of the image:
        determining CU size of the current CU;
        determining a range of pixel values in the current CU, including:

determining a maximum pixel value among the pixel values in the current CU;
determining a minimum pixel value among the pixel values in the current CU; and
determining, for the range of pixel values in the current CU, a difference between the maximum pixel value and the minimum pixel value;
based at least in part on the determined CU size of the current CU, selecting a range threshold;
encoding the current CU;
determining a number of bits used to code the current CU; and
based at least in part on (a) the range of pixel values in the current CU and (b) the number of bits used to code the current CU, determining whether to split the current CU into smaller CUs and/or prediction units (PUs) for encoding, including comparing the range of pixel values in the current CU to the selected range threshold; and
outputting the encoded image as part of a coded bit stream.

2. The one or more computer-readable memory or storage devices of claim 1 wherein the image is a still image, and wherein the operations further comprise:
setting CU size to be less than maximum CU size;
setting CU depth to be less than maximum CU depth; and
disabling residual quadtree coding, such that transform unit (TU) size equals PU size.

3. The one or more computer-readable memory or storage devices of claim 1 wherein:
the encoding the image further includes, based at least in part on the determined CU size of the current CU, selecting a bits threshold that is different than the range threshold; and
the determining whether to split the current CU further includes comparing the number of bits used to code the current CU to the selected bits threshold.

4. The one or more computer-readable memory or storage devices of claim 1 wherein the encoding the image further includes, for a particular PU of the image, determining an intra prediction mode for the particular PU using a gradient mode histogram.

5. The one or more computer-readable memory or storage devices of claim 1 wherein the encoding the image further includes, for a particular PU of the image, determining an intra prediction mode for the particular PU using a hierarchical prediction scheme with a coarse-to-fine decision-making process for intra angular prediction modes.

6. The one or more computer-readable memory or storage devices of claim 1 wherein the encoding the image further includes, for a particular PU of the image:
calculating a spatial frequency measure (SFM) for the particular PU; and
determining whether to use a transform for the particular PU based at least in part on the SFM for the particular PU.

7. The one or more computer-readable memory or storage devices of claim 6 wherein the determining whether to use the transform includes:
comparing the SFM for the particular PU to a SFM threshold;
if the SFM for the particular PU is below the SFM threshold, using the transform for the particular PU; and
otherwise, performing rate-distortion optimization (RDO) with respect to using or skipping the transform for the particular PU.

8. A method comprising:
encoding an image, including, for a current coding unit (CU) of the image:
determining CU size of the current CU;
determining a range of pixel values in the current CU, including:
determining a maximum pixel value among the pixel values in the current CU;
determining a minimum pixel value among the pixel values in the current CU; and
determining, for the range of pixel values in the current CU, a difference between the maximum pixel value and the minimum pixel value;
based at least in part on the determined CU size of the current CU, selecting a range threshold;
encoding the current CU;
determining a number of bits used to code the current CU; and
based at least in part on (a) the range of pixel values in the current CU and (b) the number of bits used to code the current CU, determining whether to split the current CU into smaller CUs and/or prediction units (PUs) for encoding, including comparing the range of pixel values in the current CU to the selected range threshold;
and
outputting the encoded image as part of a coded bit stream.

9. The method of claim 8 wherein the image is a still image, and wherein the method further comprises:
setting CU size to be less than maximum CU size;
setting CU depth to be less than maximum CU depth; and
disabling residual quadtree coding, such that transform unit (TU) size equals PU size.

10. The method of claim 8 wherein:
the encoding the image further includes, based at least in part on the determined CU size of the current CU, selecting a bits threshold that is different than the range threshold; and
the determining whether to split the current CU further includes comparing the number of bits used to code the current CU to the selected bits threshold.

11. A computing device comprising one or more processors and one or more computer-readable storage media having stored thereon computer-executable instructions for causing the computing device to perform operations comprising:
encoding an image, including, for a current coding unit (CU) of the image:
determining CU size of the current CU;
determining a range of pixel values in the current CU, including:
determining a maximum pixel value among the pixel values in the current CU;
determining a minimum pixel value among the pixel values in the current CU; and
determining, for the range of pixel values in the current CU, a difference between the maximum pixel value and the minimum pixel value;
based at least in part on the determined CU size of the current CU, selecting a range threshold;
encoding the current CU;
determining a number of bits used to code the current CU; and
based at least in part on (a) the range of pixel values in the current CU and (b) the number of bits used to code the current CU, determining whether to split the current CU into smaller CUs and/or prediction units (PUs) for encoding, including comparing the range of pixel values in the current CU to the selected range threshold; and outputting the encoded image as part of a coded bit stream.

12. The computing device of claim 11 wherein the image is a still image, and wherein the operations further comprise:
setting CU size to be less than maximum CU size;
setting CU depth to be less than maximum CU depth; and
disabling residual quadtree coding, such that transform unit (TU) size equals PU size.

13. The computing device of claim 11 wherein:
the encoding the image further includes, based at least in part on the determined CU size of the current CU, selecting a bits threshold that is different than the range threshold; and
the determining whether to split the current CU further includes comparing the number of bits used to code the current CU to the selected bits threshold.

14. The computing device of claim 11 wherein the encoding the image further includes, for a particular PU of the image, determining an intra prediction mode for the particular PU using a gradient mode histogram or using a hierarchical prediction scheme with a coarse-to-fine decision-making process for intra angular prediction modes.

15. The method of claim 8 wherein the encoding the image further includes, for a particular PU of the image, determining an intra prediction mode for the particular PU using a gradient mode histogram or using a hierarchical prediction scheme with a coarse-to-fine decision-making process for intra angular prediction modes.

* * * * *